United States Patent
Boon

(10) Patent No.: US 7,046,730 B2
(45) Date of Patent: May 16, 2006

(54) DIGITAL IMAGE CODING/DECODING METHOD AND DATA RECORDING MEDIUM FOR PADDING INTERLACE AND PROGRESSIVE IMAGES

(75) Inventor: Choong Seng Boon, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 475 days.

(21) Appl. No.: 10/645,906

(22) Filed: Aug. 22, 2003

(65) Prior Publication Data

US 2004/0042673 A1 Mar. 4, 2004

Related U.S. Application Data

(62) Division of application No. 09/155,398, filed as application No. PCT/JP98/00312 on Jan. 27, 1998.

(30) Foreign Application Priority Data

Jan. 30, 1997 (JP) .................................. 9-016112

(51) Int. Cl.
*H04N 7/12* (2006.01)
(52) U.S. Cl. ................................ 375/240.12
(58) Field of Classification Search ........... 375/240.01, 375/240.12, 240.26; H04N 7/12
See application file for complete search history.

(56) References Cited

U.S. PATENT DOCUMENTS

| | | | |
|---|---|---|---|
| 5,274,442 A | 12/1993 | Murakami et al. | |
| 5,990,956 A | 11/1999 | Lee | |
| 6,026,195 A | 2/2000 | Eifrig et al. | |
| 6,092,130 A | 7/2000 | Horiike | |
| 6,259,732 B1 | 7/2001 | Lee | |

FOREIGN PATENT DOCUMENTS

| | | |
|---|---|---|
| EP | 0 538 834 A | 4/1993 |
| JP | 3-89792 | 4/1991 |
| JP | 5-284535 | 10/1993 |
| WO | WO 97 13372 A | 4/1997 |

OTHER PUBLICATIONS

Sikora T: "The MPEG-4 Video Standard Verification Model" IEEE Transactions on Circuits and Systems for Video Technology, US, IEEE Inc. New York, vol. 7, No. 1, Feb. 1, 1997, pp. 19-31, XP000678877 ISSN: 1051-8215.

*Primary Examiner*—Young Lee
(74) *Attorney, Agent, or Firm*—Wenderoth, Lind & Ponack, L.L.P.

(57) ABSTRACT

In the digital image padding method according to the present invention, as shown in FIG. 2, every other pixels in an original image space corresponding to an input digital image signal are extracted in the horizontal direction, and every other pixels are extracted in the vertical direction, the extracted plural pixels are rearranged to form four small image spaces, and pixels values in these small image spaces are padded.

In the digital image padding method thus constructed, padding of pixel values is performed to plural small image spaces where there is high correlation of pixel values between adjacent scanning lines rather than to an original image space where there is low correlation of pixel values between adjacent scanning lines. That is, in the padded small image spaces, there is high correlation of the pixel values. As a result, it is possible to avoid introduction of high-frequency components into the digital image signal of the interlaced image, and hence, differential coding or differential decoding can be performed to the interlaced image or the like with high coding efficiency while suppressing degradation of coding efficiency resulting from padding.

8 Claims, 20 Drawing Sheets

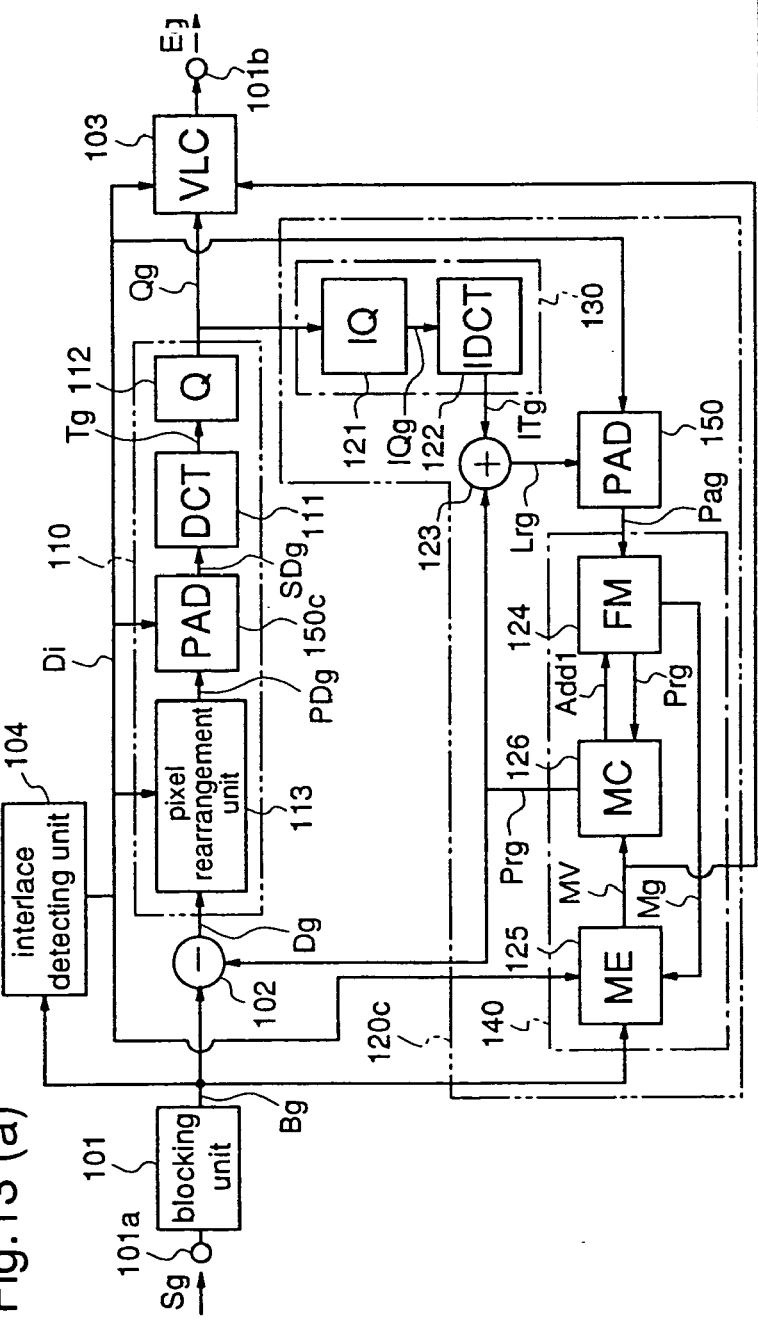
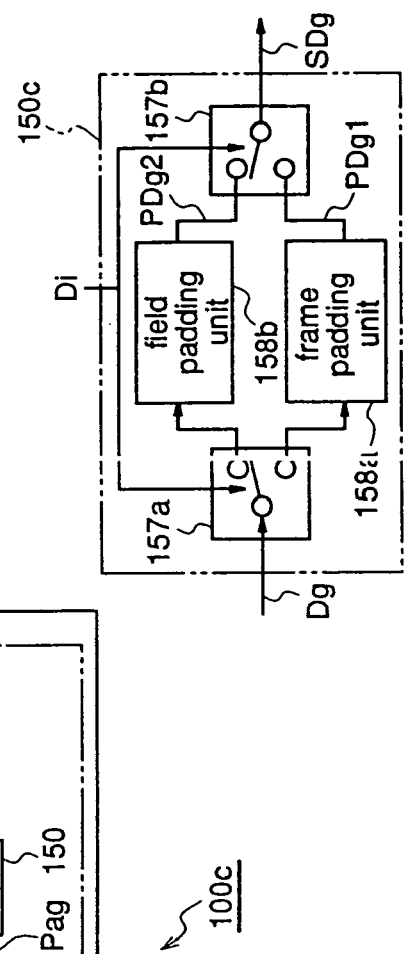
Fig.13 (a)
Fig.13 (b)

DIGITAL IMAGE CODING/DECODING METHOD AND DATA RECORDING MEDIUM FOR PADDING INTERLACE AND PROGRESSIVE IMAGES

This is a Divisional Application of U.S. application Ser. No. 09/155,398, filed Feb. 2, 1999, which is the National Stage of International Application No. PCT/JP98/00312, filed Jan. 27, 1998.

TECHNICAL FIELD

The present invention relates to a digital image padding method, an image processing apparatus, and a data recording medium and, more particularly to a padding method in which padding of pixels values is performed to a digital image signal corresponding to an interlacing scanned image having an arbitrary shape, an image processing apparatus for coding or decoding the digital image signal using this padding method, and a data recording medium which contains a program for implementing image signal processing by the padding method or the image processing apparatus in a computer.

BACKGROUND ART

In order to store or transmit digital image information efficiently, it is required that digital image information be compressively coded. In the status quo, as a method for compressively coding the digital image information, there are waveform coding methods such as subband, wavelet, fractal, and so forth, as well as DCT (Discrete Cosine Transform) typical of JPEG (Joint Photographic Coding Experts Group) or MPEG (Moving Picture Experts Group).

Meanwhile, as a method for eliminating redundant image information between adjacent frames or the like, there is a method in which inter-frame prediction is performed using motion compensation by representing values of pixels of a current frame by difference values between these values and values of pixels of a previous frame, and a difference image signal of the difference values is subjected to waveform coding.

An interlacing scanned image signal such as a video signal in a current television forms an interlaced image. In this interlaced image, one frame is composed of odd-numbered and even-numbered fields, the scanning timings of which differ from each other. For this reason, in the interlaced image, whether or not correlation of pixel values between adjacent scanning lines is high depends on largeness of motion of each object displayed on a frame (each object having an arbitrary shape in a frame image).

Accordingly, when coding an image signal corresponding to the interlaced image, in a case where there is high correlation of pixel values between scanning lines, motion compensation and waveform coding are performed to the image signal frame by frame, while in a case where there is low correlation of pixel values between scanning lines, the image signal is divided into odd-numbered and even-numbered fields, the image signals of which are subjected to motion compensation and waveform coding field by field.

In recent years, for reproducing an image signal for each of objects in a frame image while increasing efficiency in compressing an image signal, a coding method has been conceived, wherein image signals of the objects are compressively coded and transmitted separately for each object. A coded image signal which has been coded by this coding method is decoded at the reproducing end in a manner adapted to the coding method. Specifically, in this decoding, coded image signals of respective objects are decoded, and the resulting decoded image signals of respective objects are synthesized, to produce a reproduced image signal. Then, based on the reproduced image signal, a frame image comprising respective objects is displayed.

By using the coding method for performing coding to the image signal for each object as described above, it becomes possible to combine objected freely to generate a composite image, whereby moving images can be reedited with ease. In addition, a moving image comprising only objects with high importance can be displayed without reproducing objects with relatively low importance, depending on a degree of congestion of a communication path, performance of a reproducing apparatus, or preference of a viewer.

For coding an image signal of an object, (an image having an arbitrary shape) a waveform transform which performs signal processing adapting to a shape of the object, for example, shape adaptive DCT, or waveform transform to a padded image signal, is employed. In the method, specifically, padding is performed to an image signal forming an image space (rectangular region) by replacing values of pixels in its insignificant region with padding pixel values obtained by a prescribed method, and then a conventional 8×8 cosine transform is performed to the padded image signal. The insignificant region is a region outside an object in the rectangular region, and comprises pixels which have no values for displaying the object. In other words, an image signal of the insignificant region comprises so-called insignificant sample values. Also, the 8×8 cosine transform is a waveform transform which performs cosine transform to the image signal of the rectangular region for each image space comprising 8×8 pixels.

As a method for eliminating redundant signals between adjacent frames, there is a method for obtaining a difference between an image signal of a target macroblock to be coded and its prediction signal for each image space (macroblock) comprising 16×16 pixels, as a prediction error signal (difference signal). Here, it is assumed that the prediction signal is an image signal of a prediction region obtained by motion compensation. The motion compensation process detects a region comprising 16×16 pixels corresponding to an image signal in a coded or decoded frame where a difference between the image signal of the target macroblock and the image signal is the smallest, as a prediction region.

In some cases, however, the prediction region also includes pixels (hereinafter referred to as insignificant pixels) which have insignificant sample values. In such cases, when the difference between the prediction signal of the prediction region including insignificant values and an image signal of the target region is computed, difference values tend to be very large, since the sample values of the insignificant pixels are not always optimal prediction values for smaller difference.

As a solution to this, padding is performed to the image signal of the prediction region by replacing insignificant sample values by prescribed padding values, and then a difference between the padded prediction signal and the image signal of the target macroblock is computed as a difference signal (prediction error signal), which is subjected to transformation for coding. This padding of the prediction signal can suppress the difference signal.

In the prior art pixel value padding, as a padding value for an insignificant sample value, sample values of significant values (pixels having significant sample values) adjacent to the corresponding insignificant pixel in the vertical and horizontal directions, respectively, are averaged, and the resulting average is used. By the use of the average of the sample values of the significant pixels, high-frequency components into an image signal (prediction signal) in a padded image space can be suppressed, thereby increasing coding efficiency.

However, if padding which uses the average of the significant pixels adjacent to the insignificant pixels in the vertical and horizontal directions as the padding value is applied to the image signal of the interlaced image, high-frequency components of the image signal increase, which will be described below in detail.

In the interlaced image, especially in a case where motion of an object is large, there is low correlation of pixel values between adjacent scanning lines. FIG. 18 schematically shows an example of an arrangement of pixel values which shows the low correlation of pixel values between adjacent scanning lines in the interlaced image, as arrangement of pixel values in an image space 301.

The image space 301 is an image space comprising 8×8 pixels. In the figure, each pixel is represented as a square. Pixels (for example pixels 303 and 304) of hatched squares are pixels (significant pixels) having significant sample values, and pixels (for example pixel 302) of squares which are not hatched are pixels (insignificant pixels) having insignificant pixels. The number of each square indicates a sample value of the corresponding pixel.

Since scanning timings differ from each other between odd-numbered and even-numbered fields in the interlaced image, in a case where motion of an object in an image is large, it looks like the object has a shape of two outlines in a frame composed of these two fields, as it can be observed in the image space 301 in FIG. 18. In this case, for example, the significant pixel 304 is adjacent to its upper and lower insignificant pixels.

Next, a prior art padding method and its padding result will be described with reference to FIGS. 18 and 19.

In the prior art padding method, three steps are performed.

In a first step S1, sample values of insignificant pixels are replaced with sample values of significant pixels adjacent thereto in the image space 301, for insignificant pixels aligned in the horizontal direction, in the order from inward to outward of the image space 301. Then, sample values of insignificant pixels in the image space to which this horizontal replacement process has been performed are replaced with sample values of significant pixels adjacent direction, in the order from inward to outward of the image space. Process in the first step S1 thus performed to the image space 301 results in an image space 350 comprising pixels having sample values shown in FIG. 18.

More specifically, in the horizontal replacement process in the first step S1, sample values of insignificant pixels on pixel rows 354–359 in the image space 350 are replaced with padding values (sample values of significant pixels). In addition, in the vertical replacement process in the first step S1, sample values of insignificant pixels on pixel rows 352 and 353 are replaced with sample values of significant pixels and padded pixels (insignificant pixels whose sample values have been replaced with padding values) on the pixel row 354.

In a second step S2, in the reversed order of the first step S1, sample values of insignificant pixels are replaced with sample values of significant pixels adjacent thereto in the image space 301, for insignificant pixels aligned in the vertical direction, in the order from inward to outward of the image space. Then, sample values of insignificant pixels are replaced with sample values of significant pixels adjacent thereto in the image space to which vertical replacement process has been performed, for insignificant pixels aligned in the horizontal direction, in the order from inward to outward of the image space. Process in the second step S2 thus performed to the image space 301 results in an image space 351 comprising pixels having sample values shown in FIG. 18.

More specifically, in the vertical replacement process in the second step S2, sample values of insignificant pixels on pixel columns 362-365 are replaced with padding values in the image space 351. In addition, in the horizontal replacement process in the second step S2, sample values of insignificant pixels on pixel columns 360 and 361 are replaced with sample values of significant pixels and padded pixels on the pixel column 362, and likewise, sample values of insignificant pixels on pixel columns 367 and 368 are replaced with sample values of significant pixels and padded pixels on the pixel column 365.

In a third step S3, as shown in FIG. 19, sample values of pixels in the image space 350 obtained through the first step S1 and the corresponding pixels in the image space 351 obtained through the second step S2 are averaged, which results in an image space 380 comprising pixels having sample values in FIG. 19.

Resampling which divides pixels forming the image space 380 into pixels corresponding to odd-numbered and even-numbered fields based on an assumption that the image space 380 is a frame, results in an image space 381 comprising plural pixels corresponding to the odd-numbered field and an image space 382 comprising plural pixels corresponding to the even-numbered field as a shown in FIG. 20. In the image spaces 381 and 382 corresponding to these respective fields, sample values of pixels are non-uniform, which introduces high-frequency components into image signals in image spaces 381 and 382.

In addition, this problem associated with the padding occurs in the non-interlacing scanned image (progressive image) as well as in the interlacing scanned image (interlaced image). Specifically, in many cases, the progressive image has a stripe pattern, and for the case of the progressive image having the stripe pattern, the above resampling is performed in such a manner that plural pixels forming a frame (image space) are collected into a stripe portion and the other portion in the image space, to form image spaces corresponding to the stripe pattern portion and the other portion, and then the resulting resampled image spaces are coded.

In this case, if padding is performed to the image signal of the progressive image having the stripe pattern by the prior art padding method, high-frequency components are introduced into an image signal corresponding to the resampled image space, leading to degraded coding efficiency.

Further, a similar problem occurs in padding methods other than the above, which computes padding values using significant sample values adjacent to insignificant pixels in the horizontal or vertical direction.

SUMMARY OF THE INVENTION

The present invention is directed to solving the above-mentioned problem and has an object to provide a digital image padding method in which padding is performed to an interlacing scanned image or an image of a stripe pattern having an arbitrary shape while suppressing degradation of efficiency in coding the prediction error signal, an image processing apparatus which performs image coding or image decoding by the padding method, and a data recording medium which contains a program for implementing these image processing by the padding method or the image processing apparatus in a computer.

According to a first aspect of the present invention, a digital image padding method is provided for performing padding of pixel values to a digital image signal forming an original image space comprising an image having an arbitrary shape and comprising significant pixels and insignificant pixels, comprises a pixel rearrangement step in which plural pixels in the original image space are grouped according to a prescribed rule, to form plural small image spaces each comprising pixels of the same group; and a pixel padding step in which values of insignificant pixels in each small image space are replaced with padding pixel values generated by a prescribed method.

In the digital image padding method thus constructed, plural pixels forming the original image space are extracted according to a prescribed rule, to form plural small images. In other words, it is possible to divide the original image space where there is low correlation of pixel values between adjacent pixels or scanning lines into plural small images where there is high correlation of pixel values between the adjacent pixels or scanning lines. Accordingly, padding is performed to the interlacing scanned image or the image of a stripe pattern having an arbitrary shape for each small image space with high correlation of the pixel values rather than the original image space with low correlation of pixel values between adjacent pixels or scanning lines. In this case, in the padded small image, there is high correlation of the pixel values, and it is possible to avoid introduction of high-frequency components into the image signal corresponding to the original image space in process for padding the interlacing scanned image or the image of a stripe pattern having an arbitrary shape.

As a result, differential coding or differential decoding is performed to the interlacing scanned image while suppressing degradation of coding efficiency resulting from the padding.

According to a second aspect of the present invention, in the digital image padding method of the first aspect of the invention, in the pixel rearrangement step, sampling is performed by extracting pixels every (N+1)-th (N: positive integer) pixel in a prescribed direction of the image space (N+1) times by using the first to the (N+1)-th pixels as starting sample pixels, to form (N+1) pieces of small image spaces each comprising a prescribed number of pixels obtained by one sampling.

In the digital image padding method thus constructed, pixels in the original image space are extracted at intervals of a prescribed number of pixels in a prescribed direction of the original image space, to form the small image spaces. Therefore, it is possible to divide the original image space comprising an image having an arbitrary shape of a vertical stripe pattern or a horizontal stripe pattern into small image spaces where there is high correlation of pixel values between adjacent pixel rows or between adjacent pixel columns, irrespective of a width or arrangement spacing of stripes.

According to a third aspect of the present invention, in the digital image padding method of the second aspect of the invention, operation values obtained by performing operation on values of significant pixels in an N-th (n=1, 2, ..., N+1) small image space are used as the padding pixel values for replacing the values of insignificant pixels in the n-th small image space.

In the digital image padding method thus constructed, values of insignificant pixels in a small image space are replaced with padding pixel values obtained from values of significant pixels in the same small image. Therefore, it is possible to suppress generation of pixel values which are significantly different from values of significant pixels in the small image space in padding process.

According to a fourth aspect of the present invention, the digital image padding method of the second aspect of the invention further comprises an image space restoring step in which plural pixels forming padded small image spaces are rearranged following a rule adapted to the prescribed rule of the grouping so that these pixels forms a restored image space which has the same pixel rearrangement as the original image space.

In the digital image padding method thus constructed, after the original image space is divided into plural small images where there is high correlation of pixel values, and padding of pixel values is performed to these small image spaces, pixels in the padded small image space are rearranged so that they have the same arrangement as the original image space. Therefore, the image signal corresponding to the padded original image space can be processed in the same manner that the image signal corresponding to the unpadded original image space is processed.

According to a fifth aspect of the present invention, in the digital image padding method of the fourth aspect of the invention, operation values obtained by performing operation on values of significant pixels in an n-th (n=1, 2, ..., N+1) small image space are used as the padding pixel values for replacing the values of insignificant pixels in the n-th small image space.

In the digital image padding method thus constructed, values of insignificant pixels in a small image space are replaced with padding pixel values obtained from values of significant pixels in the same small image space. Therefore, it is possible to suppress generation of pixel values which are significantly different from values of significant pixels in the small image space in padding process.

According to a sixth aspect of the present invention, in the digital image padding method of the first aspect of the invention, in the pixel rearrangement step, sampling is continuously performed twice using the first and second pixel rows as starting sample pixel rows, by extracting pixels on every other pixel row in the vertical direction of the original image space, to form first and second small image spaces each comprising a prescribed number of pixels obtained by the first and second samplings, respectively.

In the digital image padding method thus constructed, every other pixels are extracted in the vertical direction of the original image space, to form a small image space composed of odd-numbered scanning lines in the original image space and a small image space composed of even-numbered scanning lines and a small image space composed of even-numbered scanning lines. Therefore, padding of the interlacing scanned image is performed for each small image space corresponding to each field where there is high correlation of pixel values between adjacent scanning lines rather than the original image space where there is low correlation of pixel values between them. As a result, it is possible to avoid introduction of high-frequency components into an image signal of the interlacing scanned image in padding process.

According to a seventh aspect of the present invention, a digital image padding method for performing padding of pixel values to a digital image signal forming an original image space comprising an image having an arbitrary shape and comprising significant pixels and insignificant pixels, comprises the steps of dividing the original image space into a first small image space comprising pixels on odd-numbered pixel rows in the original image space and a second small image space comprising pixels on even-numbered pixel rows in the original image space; and generating first padding pixel values from values of significant pixels in the first small image space and replacing values of insignificant pixels in the first small image space with the first padding pixel values, and generating second padding pixel values from values of significant pixels in second small image space and replacing values of insignificant pixels in the second small image space with the second padding pixel values.

In the digital image padding method thus constructed, padding of the interlacing scanned image is performed for each of first and second small image spaces corresponding to fields where there is high correlation of pixel values between adjacent scanning lines rather than the original image space where there is low correlation of pixel values between them. As a result of this, it is possible to avoid introduction of components into an image signal of the interlacing scanned image in padding process.

Besides, values of insignificant pixels in each small image space are replaced with padding pixel values obtained from values of significant pixels in the same small image space, and it is therefore possible to suppress generation of pixels values which are significantly different from values of significant pixels in the small image space in padding process.

According to an eighth aspect of the present invention, a digital image padding method for performing padding to a digital image signal forming an original image space comprising an image having an arbitrary shape and comprising significant pixels and insignificant pixels, by replacing values of insignificant pixels with padding pixel values determined from values of significant pixels in the original image space, wherein, significant pixels which have values used for determining the padding pixel values are pixels other than pixels adjacent to insignificant pixels to be padded.

In the digital image padding method thus constructed, the padding pixel values for replacing values of insignificant pixels are determined from values of significant pixels other than pixels adjacent to the insignificant pixels in the original image space, and therefore the values of the insignificant pixels are not replaced with the values of the pixels adjacent thereto. As a result, it is possible to perform padding of pixel values to the original image space where there is low correlation of pixel values between adjacent pixels or scanning lines while suppressing introduction of high-frequency components into the image signal corresponding to the original image space.

According to a ninth aspect of the present invention, in the digital image padding method of the eighth aspect of the invention, significant pixels which have values used for determining the padding pixel values are one pixel apart from the insignificant pixels to be padded.

In the digital image padding method thus constructed, values of insignificant pixels on an odd-numbered scanning line are replaced with padding pixel values obtained from values of significant pixels on another odd-numbered scanning line in the original image space, and values of insignificant pixels on an even-numbered scanning line are replaced with padding pixel values obtained from values of significant pixels on another even-numbered scanning line in the original image space. Therefore, it is possible to avoid introduction of high-frequency components into the image signal corresponding to the interlacing scanned image in padding process.

According to a tenth aspect of the present invention, an image processing apparatus for performing image coding which comprises a correlation identifying device for identifying correlation between pixel values of a digital image signal and outputting a sample identifier according to the identification result, a coding section for performing differential coding to the digital image signal by the use of a prediction image signal of the digital image signal according to the sample identifier and outputting a coded image signal, and a predicting section for producing the prediction image signal based on a decoded image signal in which the coded image signal has been locally decoded, the coding section comprises a subtracter for computing difference between the digital image signal and the prediction image signal as a difference signal; a data compressing device for compressing the difference image signal to produce a compressed image signal; and a variable length encoder for performing variable length coding to the compressed difference signal, and the predicting section comprises a data expanding device for expanding the compressed difference signal to produce an expanded difference signal; an adder for adding the expanded difference signal to the prediction image signal to produce a decoded image signal; a padding device for performing padding according to the sample identifier by rearranging pixels in an image space formed by the decoded image signal and replacing values of insignificant pixels in the image space where the pixels have been rearranged with padding pixel values generated by a prescribed method; and a prediction image signal producing device for producing the prediction image signal from the padded decoded image signal according to the sample identifier.

In the digital processing apparatus thus constructed, the predicting section for producing the prediction image signal of the digital image signal, comprises the padding device for performing padding of pixel values to the decoded image signal in which the coded difference signal has been locally decoded in its differential coding process, and is used for producing the prediction image signal from the padded decoded image signal, the padding device first rearranging pixel values of the decoded image signal and then replacing the values of the insignificant pixels of the decoded image signal with the prescribed padding pixel values. Therefore, when performing differential coding to the digital image signal of the interlacing scanned image or the image of a stripe pattern having an arbitrary shape, it is possible in padding process to avoid introduction of high-frequency components into the prediction image signal for use by differential coding, differential coding can be performed to the interlacing scanned image while suppressing degradation of coding efficiency resulting from the padding.

According to an eleventh aspect of the present invention, in the image processing apparatus of the tenth aspect of the invention, the coding section further comprises a padding device for performing padding to the difference image signal according to the sample identifier by rearranging pixels in the image space formed by the difference image signal and replacing values of insignificant pixels in the image space where the pixels have been rearranged with padding pixel values generated by a prescribed method, and the data compressing device performs information compression to the padded difference image signal to produce a compressed difference image signal.

In the image processing apparatus thus constructed, pixel values of the difference image signal input to the data compressing device are rearranged, and then padding is performed by replacing values of the insignificant pixels of the difference signal with the prescribed padding pixel values. Therefore, it is possible to avoid introduction of high-frequency components into the image signal input to the data compressing means. As a result, when performing differential coding to the digital image signal of the interlacing scanned image or the image of a stripe pattern having an arbitrary shape, waveform transform such as DCT is performed with high efficiency.

According to a twelfth aspect of the present invention, an image processing apparatus for performing image decoding which comprises a reproducing section for reproducing a coded image signal in which a digital image signal has been coded by the use of a prediction image signal of the digital image signal and outputting a reproduced image signal, and a predicting section for producing the prediction image signal from the reproduced image signal, and the reproducing section comprise a data analyzing unit for analyzing the coded image signal to extract a compressed difference signal of the digital image signal and a sample identifier indicating correlation between pixel values of the digital image signal from the coded image signal; a data expanding device for expanding the compressed difference signal to produce an expanded difference signal; and an adder for adding the expanded difference signal to the prediction signal to produce the reproduced image signal, and in the predicting section, using at least one of the reproduced image signal and the prediction image signal obtained from the reproduced image signal as a signal to be padded, padding is performed to the signal to be padded according to the sample identifier, by rearranging pixels in an image space formed by the signal to be padded and replacing values of insignificant pixels in the image space where the pixels have been rearranged with padding pixel values generated by a prescribed method.

In the image processing apparatus thus constructed, the predicting section for producing the prediction image signal of the digital image signal comprises a padding device for performing padding of pixel values to the reproduced image signal or the prediction image signal of the digital image signal as the signal to be padded, and the padding process rearranges pixel values of the signal to be padded and then replaces values of insignificant pixels of the signal to be padded with prescribed padding pixel values. Therefore, when decoding a coded difference signal of the interlacing scanned image or the image of a stripe pattern having an arbitrary shape, it is possible to avoid introduction of high-frequency components into the prediction image signal for use by the differential decoding. As a result, differential decoding adapted to differential coding which suppresses degradation of coding efficiency resulting from padding of pixel values, is realized.

According to a thirteenth aspect of the present invention, in the image processing apparatus of the twelfth aspect of the invention, the predicting section further comprises a padding device for performing padding to the reproduced image signal frame by frame or field by field according to the sample identifier, and a frame memory for storing a padded reproduced signal in which the reproduced image signal has been padded, and outputs the padded reproduced image signal stored in the frame memory to the reproducing section as the prediction image signal.

In the image processing apparatus thus constructed, padding is performed to the reproduced image signal according to the sample identifier frame by frame or by field by field. Therefore, especially when performing differential decoding to the digital image signal of the interlacing scanned image, it is possible to avoid introduction of high-frequency component into the prediction image signal obtained from the reproduced image signal in padding process.

According to a fourteenth aspect of the present invention, in the image processing apparatus of the twelfth aspect of the invention, the predicting section further comprises a frame memory for storing the reproduced image signal, and a padding device for performing padding to the prediction image signal extracted from the reproduced image signals stored in the frame memory frame by frame or field by field according to the sample identifier, and outputs the padded prediction image signal to the reproducing section.

In the image processing apparatus thus constructed, padding is performed to the prediction image signal according to the sample identifier frame by frame or by field by field. Therefore, especially when performing differential decoding to the digital image signal of the interlacing scanned image, it is possible to avoid introduction of high-frequency components into the prediction image signal in the process for padding the prediction image signal. Besides, since padding is performed only to the prediction signal fetched from the frame memory, amount of signals to be padded in the predicting section can be reduced.

According to a fifteenth aspect of the present invention, an image processing apparatus for performing image decoding, which comprises a reproducing section for reproducing a coded image signal in which a digital image signal has been coded by the use of a prediction image signal of the digital image signal and outputting a reproduced image signal, and a predicting section for producing the prediction image signal from the reproduced image signal, the reproducing section comprises a data analyzing unit for analyzing the coded image signal to extract a compressed difference signal of the digital image signal and a sample identifier indicating correlation between pixel values of the digital image signal from the coded image signal; a data expanding device for expanding the compressed difference signal to produce an expanded difference signal; and an adder for adding the expanded difference signal to the prediction image signal to produce the reproduced image signal, and the predicting section comprises a padding device for performing padding to the reproduced image signal according to the sample identifier, by replacing values of insignificant pixels in an image space formed by the reproduced image signal with padding pixels values generated from values of significant pixels other than pixels adjacent to the insignificant pixels; and a rearrangement device for rearranging pixels in an image space formed by the padded reproduced image signal, according to the sample identifier.

In the digital image processing apparatus thus constructed, when performing padding to the reproduced image signal obtained from the coded difference image signal containing digital image information, the padding pixel values for replacing values of insignificant pixels are determined from values of significant pixels other than pixels adjacent to the insignificant pixels in the image space formed by the reproduced image signal. Therefore, values of insignificant pixels will not be replaced with values of pixels adjacent thereto. As a result, when performing differential decoding to the digital image signal, it is possible to perform padding of pixel values in the original image space where there is low correlation of pixel values between adjacent pixels or scanning lines while suppressing introduction of high-frequency components into the image signal in the original image space.

According to a sixteenth aspect of the present invention, a data recording medium for storing a program which makes a computer perform padding of pixel values to a digital image signal forming an original image space comprising an image having an arbitrary shape and comprising significant pixels and insignificant pixels, and the program makes the computer perform padding of the pixel values according to the digital image padding method of the first aspect of the invention.

By loading the program stored in the data recording medium thus constructed into the computer, padding is implemented by the computer without degrading coding efficiency when performing differential coding or differential decoding to the interlacing scanned image or the like.

According to a seventeenth aspect of the present invention, a data recording medium for storing a program which makes a computer perform padding of pixel values to a digital image signal forming an original image space comprising an image having an arbitrary shape and comprising significant pixels and insignificant pixels, and the program makes the computer perform padding of pixel values according to the digital image padding method of the seventh aspect of the invention.

By loading the program stored in the data recording medium thus constructed into the computer, padding is implemented by the computer without degrading coding efficiency when performing differential coding or differential decoding to the interlacing scanned image.

According to an eighteenth aspect of the present invention, a data recording medium for storing a program which makes a computer perform padding of pixel values to a digital image signal forming an original image space comprising an image having an arbitrary shape and comprising significant pixels and insignificant pixels, and the program makes the computer perform padding of pixel values according to the digital image padding method of the eighth aspect of the invention.

By loading the program stored in the data recording medium thus constructed into the computer, padding is implemented by the computer without degrading coding efficiency when performing differential coding or differential decoding to the interlacing scanned image.

According to the nineteenth aspect of the present invention, a data recording medium for storing a program which makes a computer perform image signal coding, and the program makes the computer perform differential coding to a digital image signal by image processing apparatus of the tenth aspect of the invention.

By loading the program stored in the data recording medium so constructed into the computer, differential coding of the interlacing scanned image or the like is implemented by software with no degradation of coding efficiency resulting from padding.

According to a twentieth aspect of the present invention, a data recording medium for storing a program which makes a computer perform image signal decoding, and the program makes the computer perform differential decoding to the digital image signal by the image processing apparatus of the twelfth aspect of the invention.

By loading the program stored in the data recording medium thus constructed, differential decoding of the interlacing scanned image, which is adapted to differential coding with no degradation in coding efficiency resulting from padding, is implemented by software.

According to a twenty-first aspect of the present invention, a data recording medium for storing a program which makes a computer perform image signal decoding, and the program makes the computer perform differential decoding to the digital image signal by the image processing apparatus of the fifteenth aspect of the invention.

By loading the program stored in the data recording medium thus constructed into the computer, differential decoding of the interlacing scanned image or the like, which is adapted to differential coding with no degradation of coding efficiency resulting from coding, is implemented by software.

BRIEF DESCRIPTION OF THE DRAWINGS

FIG. 9 is a block diagram for explaining an image coding apparatus according to a third embodiment of the present invention, wherein FIG. 9(a) shows an entire structure of the image coding apparatus and FIG. 9(b) shows a structure of a padding section in the image coding apparatus.

FIGS. 10(a)–10(d) are diagrams for explaining padding in the image coding apparatus of the third embodiment, wherein FIGS. 10(a), 10(b), and 10(c) show rearrangement of pixels, frame padding, field padding, and merging for restoration.

FIG. 13 is a block diagram for explaining an image coding apparatus according to a modification 2 of the third embodiment, wherein FIG. 13(a) shows an entire structure of the image coding apparatus and FIG. 13(b) shows a padding section of the image coding apparatus.

DESCRIPTION OF THE PREFERRED EMBODIMENTS

Now, preferred embodiments of the present invention will be described with reference to FIGS. 1–17.

Embodiment 1

Figure 1:
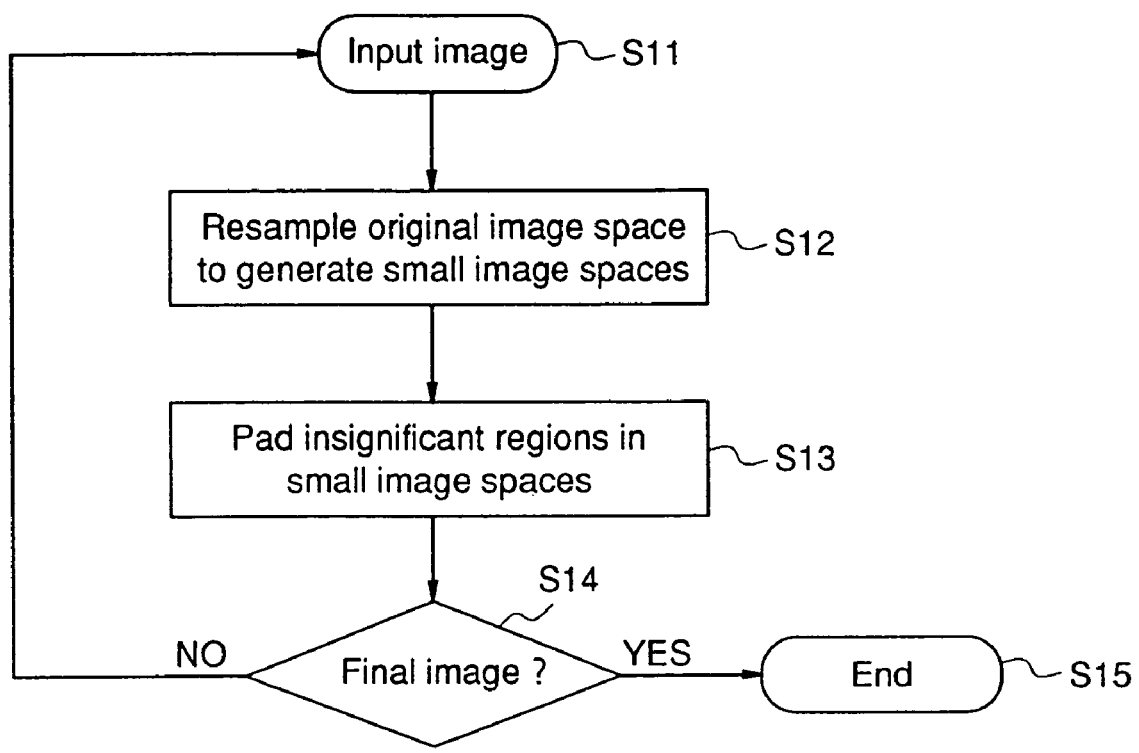
FIG. 1 is a diagram showing a flow of image processing in a digital image padding method according to a first embodiment of the present invention.
Figure 2:
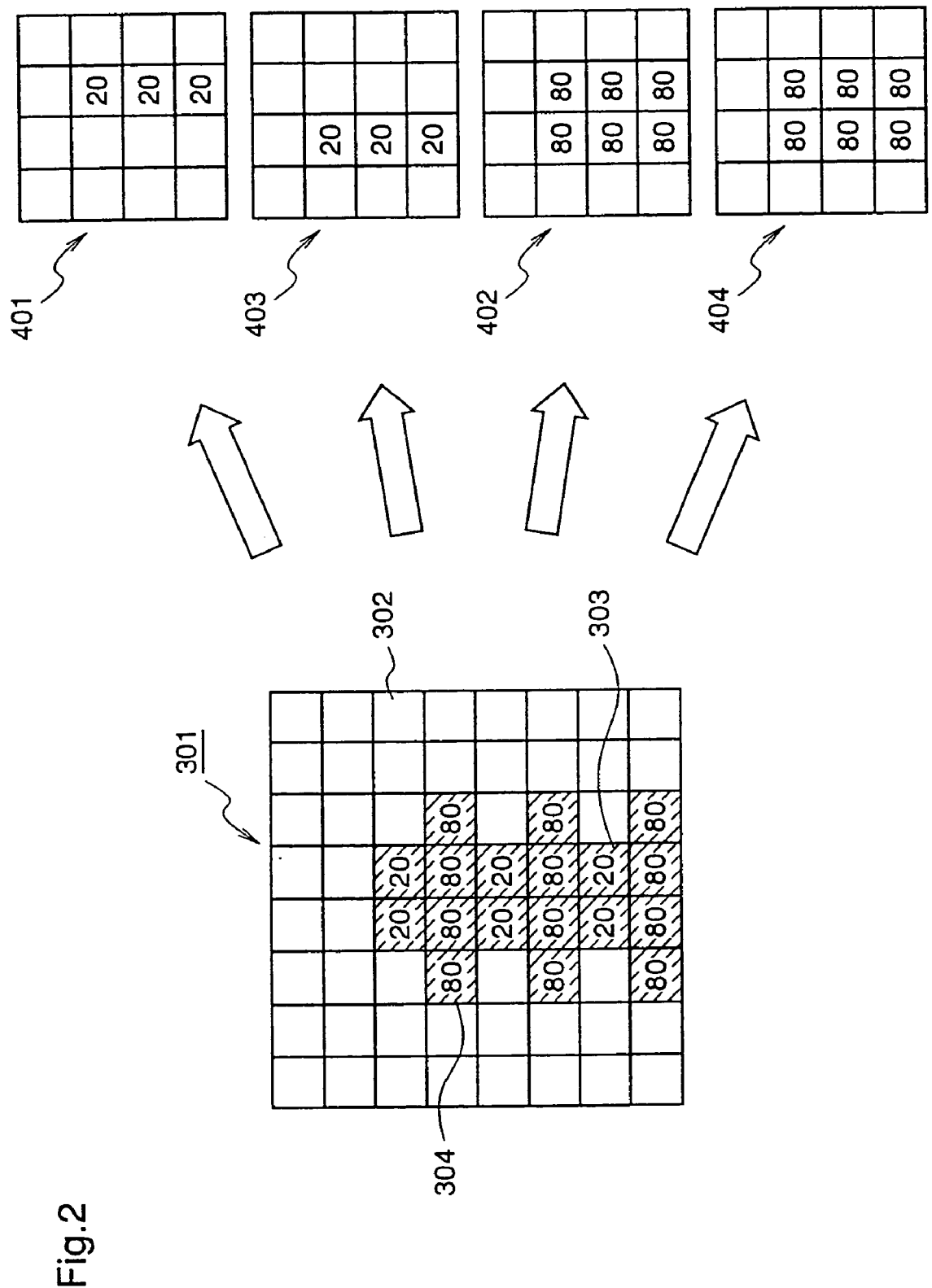
FIG. 2 is a diagram showing resampling in the digital image padding method of the first embodiment.
Figure 3:
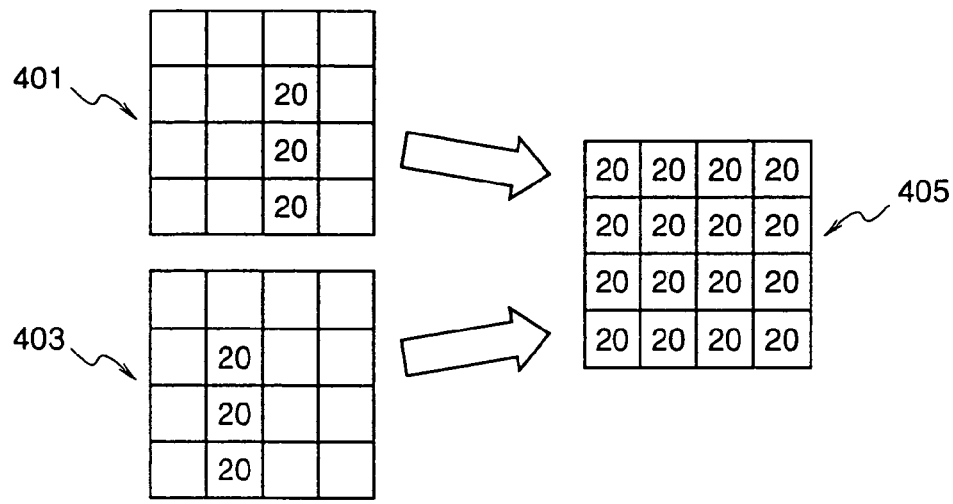
FIGS. 3(a) and 3(b) are diagrams showing padding of pixel values in the digital image method of the first embodiment.
FIG. 3(c) is a diagram showing merging of pixels in the digital image padding method according to modification 1 of the first embodiment.
Figure 3:
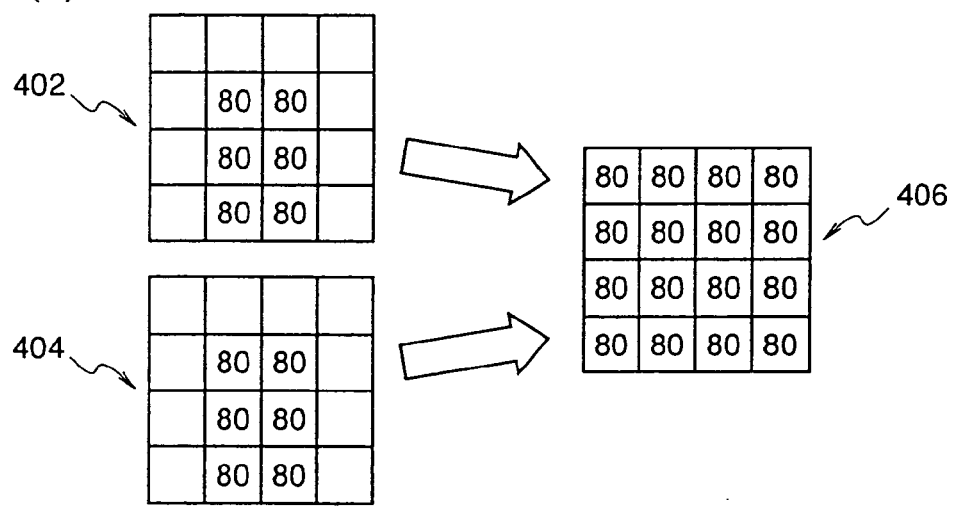
Figure 3:
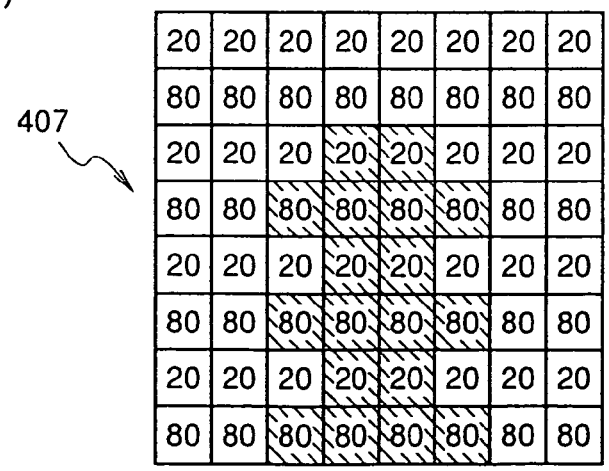

FIGS. 1–3 are diagrams for explaining a digital image padding method according to a first embodiment of the present invention. FIG. 1 shows flow of processing of an image signal in the padding method.

The digital image padding method of the first embodiment, as shown in FIG. 1, includes resampling an original image space formed by a sampled input image signal to form plural small image spaces (step S12), and performing padding to each of the small image spaces by replacing sample values of insignificant pixels with padding pixel values obtained by a prescribed method.

FIG. 2 schematically shows resampling according to the digital image padding method. An original image space 301 corresponding to the input image signal, comprises 8×8 pixels, which are significant pixels having significant sample values and insignificant pixels having insignificant sample values. In FIG. 2, each pixel is represented by a square. The significant pixels are pixels (for example, pixels 303 and 304) of squares which are hatched, and the insignificant pixels are pixels (for example pixel 302) which are not hatched. The numbers of respective squares indicate the corresponding sample values.

Small image spaces 401–404 resulting from the resampling each comprises 4×4 pixels. In this embodiment, the small image space 401 comprises pixels, which are positioned where odd-numbered pixel columns and odd-numbered pixel rows intersect in the original image space 301. The small image space 403 comprises pixels, which are positioned where even-numbered pixel columns and odd-numbered pixel rows intersect in the original image space 301. The small image space 402 comprises pixels, which are positioned where odd-numbered pixel columns and even-numbered pixel rows intersect in the original image space 301. The small image space 404 comprises pixels, which are positioned where even-numbered pixel columns and even-numbered pixel rows intersect in the original image space 301.

FIG. 3 schematically shows padding in the digital image padding method of the first embodiment. The small image spaces 401 and 403 are padded as in the case of the prior art padding, to form a small image space 405 (see FIG. 3(a)), and the small image spaces 402 and 404 are padded as in the case of the prior art padding, to form a small image space 406 (see FIG. 3(b)).

Subsequently, operation and effects will be described.

In the padding method of the first embodiment, in step S11, a sampled digital image signal is input. In this embodiment, suppose that the digital image signal corresponds to an object, i.e., an image having an arbitrary shape, and forms the original image space 301 shown in FIG. 2 including the object.

Note that the digital image signal may correspond to the interlacing scanned image (interlaced image) or the non-interlacing scanned image (progressive image). Where the digital image signal corresponds to the progressive image, for example, an image of an object of a horizontal stripe pattern corresponds to the image in the original image space 301 in FIG. 2. On the other hand, where the digital image signal corresponds to the interlaced image, an image which moves greatly corresponds to the image of the original image space 301. In this interlaced image, as shown in FIG. 2, it sometimes looks like the object has a shape of two outlines.

Also, the original image space 301 may be a region of the object (object region) itself comprising the object, or may be one of plural image spaces (blocks) each comprising a prescribed number of pixels (for example N×M samples), into which region is divided. In this embodiment, for convenience, assume that digital image signals of object regions are sequentially input frame by frame in step S11.

In step S12, the original image space 301 of the digital image signal is resampled to generate plural small image space 401–404. Specifically, every other pixels are extracted in the horizontal direction and pixels on every other pixel row are extracted in the vertical direction in the original image space 301, to generate the four small image spaces 401–404.

These small image spaces will be described to be more detailed. Pixels at which odd-numbered pixel columns and odd-numbered pixel rows intersect in the original image space 301 are extracted, to form the small image space 401, and pixels at which even-numbered pixel columns and odd-numbered pixel rows intersect are extracted, to form the small image space 403. Further, pixels at which odd-numbered pixel columns and even-numbered pixel rows intersect in the original image space 301 are extracted to form the small image space 402, and pixels at which even-numbered pixel columns and even-numbered pixel rows intersect in the original image space 301 are extracted to form the small image space 404.

Figure 18:
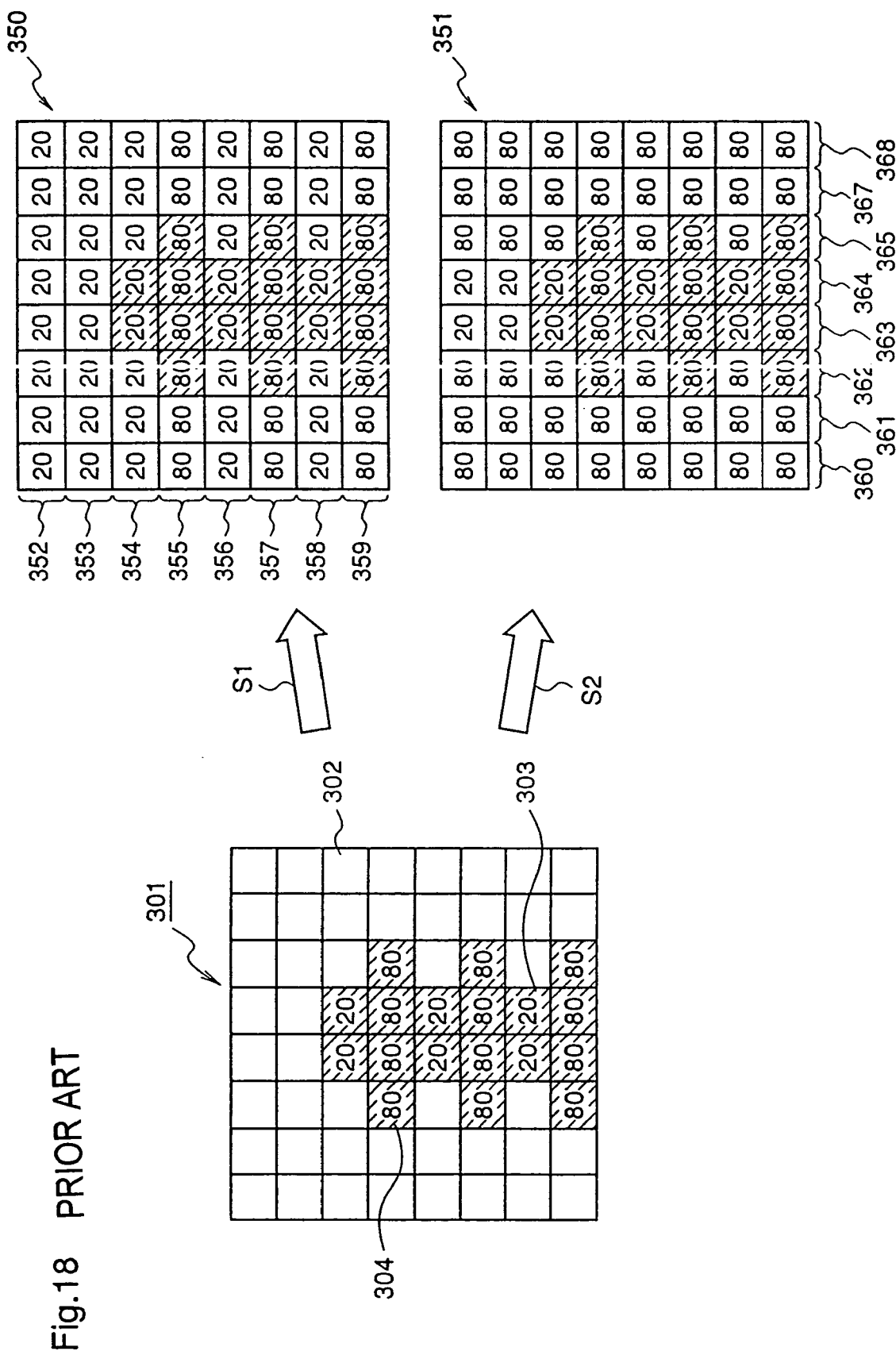
FIG. 18 is a diagram showing replacement of pixel values in a prior art digital image padding method.
Figure 19:
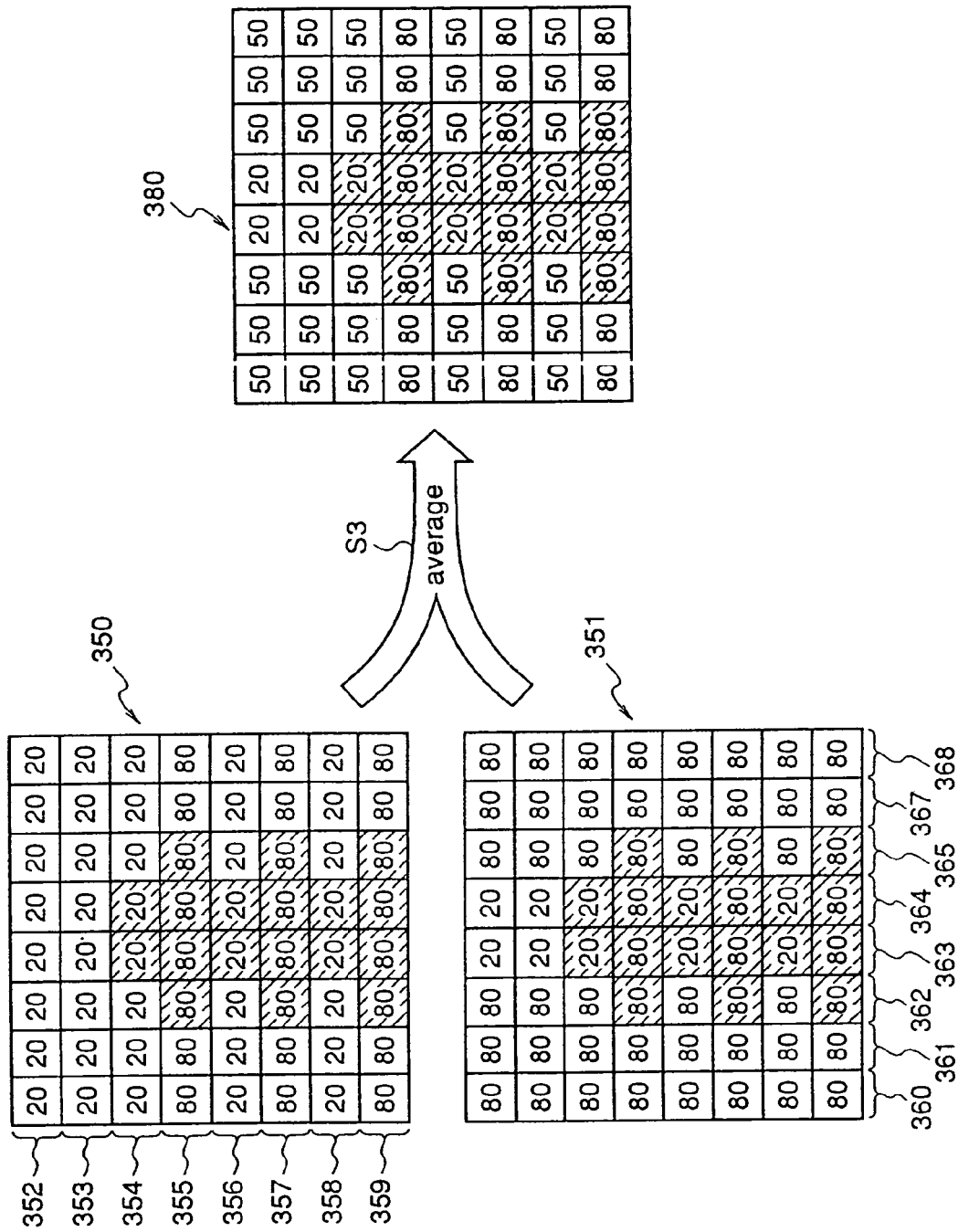
FIG. 19 is a diagram showing averaging of pixel values in the prior art digital image padding method.

In subsequent step S13, each of the small image spaces 401–404 are padded. Padding process of this embodiment comprises first to third steps S1–S3 in the prior art padding method thereinafter referred to as first to third padding steps) shown in FIGS. 18 and 19.

In the first padding step, sample values of insignificant pixels are replaced with sample values of significant pixels adjacent to the insignificant pixels in the horizontal direction in the order from inward to outward of the small image space, and then sample values of insignificant pixels are replaced with sample values of significant pixels or padded pixels (insignificant pixels whose sample values have been replaced) adjacent thereto in the vertical direction in the order from inward to outward of the small image space to which horizontal replacement process has been performed.

In the second padding step, in the reversed order of the first padding step, sample values of insignificant pixels are replaced with sample values of significant pixel adjacent to the insignificant pixels in the vertical direction in the order from inward to outward of the small image space, and then sample values of insignificant pixels are replaced with sample values of significant pixels or padded pixels adjacent thereto in the horizontal direction in the order from inward to outward of the small image space to which vertical replacement process has been performed.

In the third padding step, sample values of pixels in the small image space obtained from replacement process in the first padding step and sample values of pixels at the corresponding positions in the small image space obtained from the replacement process in the second padding step are averaged, to obtain sample values of pixels forming the small image space.

As a result of this padding, the small image spaces 401 and 403 are respectively changed into a small image space 405 comprising pixels having sample values in FIG. 3(a) and the small image spaces 402 and 404 are respectively changed into a small image space 406 comprising pixels having sample values in FIG. 3(b).

Figure 20:
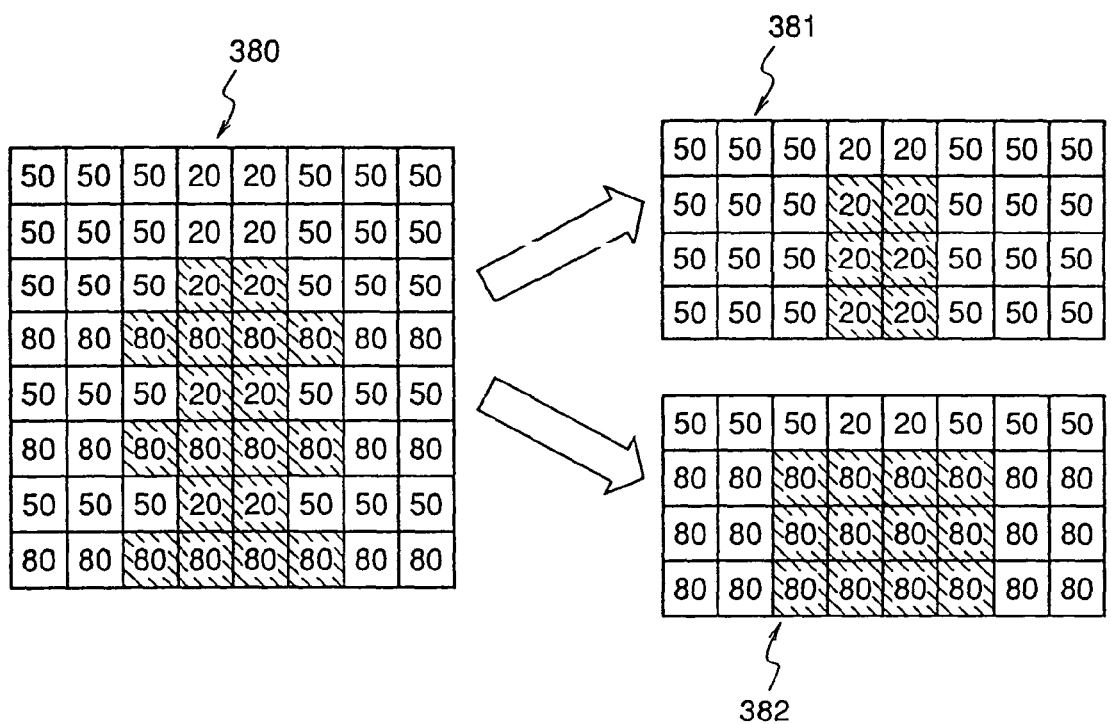
FIG. 20 is a diagram showing resampling of pixel values in the prior art digital image padding method.

Comparing these small image spaces resulting from padding to the odd-numbered field image 381 and the even-numbered field image space 382 (see FIG. 20) obtained by the prior art method, sample values of pixels in the small image spaces 405 and 406 (see FIG. 3) are uniform, which shows that high-frequency components are not introduced into the image signals of these small images.

In final step S14, it is decided whether or not the resampled original image space corresponds to a final frame of the digital image signal. When decided that the original image space corresponds to the final frame, process in steps S11–S14 are completed (Step S15), whereas when decided that the original image space does not correspond to the final frame, the steps S11–S14 are performed to an original image space corresponding to a subsequent frame.

Thus, in the first embodiment, every other pixels are extracted in the horizontal direction and pixels on every other pixel row are extracted in the vertical direction of the original image space 301 corresponding to the input image signal, and then the extracted plural pixels are rearranged to form 4 small image spaces 401–404, to which padding of pixel values are performed. Therefore, padding is performed to plural small image spaces where there is high correlation of pixel values between adjacent scanning lines rather than an original image space where there is low correlation of pixel values between adjacent scanning lines. This results in padded small image spaces where there is high correlation of pixel values. As a result, it is possible to avoid introduction of high-frequency components into the digital image signal of the interlaced image in process for padding the interlaced image which moves greatly, and hence it is possible to perform differential coding or differential decoding to the interlaced image or the like with high coding efficiency while suppressing degradation of coding efficiency resulting from padding.

While in the first embodiment the original image space corresponds to the object region comprising the object, the original image space may correspond to one of blocks as coding units into which the object region is divided. In this case, in the step S14, it is decided whether or not the original image space corresponds to a final block of the object region. When decided that the original image space does not correspond to the final block, the steps S12–S14 are performed to an original image space corresponding to a subsequent block, whereas when decided that the original image space corresponds to the final block, it is decided whether or not the original image space corresponds to a final frame, and according to its decision result, it is decided whether process is completed or the steps S12–S14 are performed to an original image space corresponding to a first block of a subsequent frame.

In addition, while in the first embodiment the padding process comprises the first to third padding steps, only the first or second padding step may be performed for padding.

Further, while in the first embodiment, as padding values for replacing sample values of insignificant pixels in the small image space, sample values of significant pixels adjacent to the insignificant pixels are used, an average of sample values of plural significant pixels in the small image space, or an average of sample values of plural significant pixels located at a boundary of an object in the small image space, may be used as the padding value.

Still further, while in the first embodiment, every other pixels are extracted in the horizontal direction and pixels on every other line are extracted in the vertical direction of the original image space corresponding to the digital image space, in general, pixels may be extracted every (N+1)-th (N: positive integer) pixel in the horizontal direction and every (N+1)-th pixel row in the vertical direction of the original image space. Intervals at which pixels are extracted may vary adaptively depending on a stripe pattern or the like of an image formed by a digital image signal.

Subsequently, modifications 1–3 of the first embodiment will be described.

Modification 1 of First Embodiment

Figure 4:
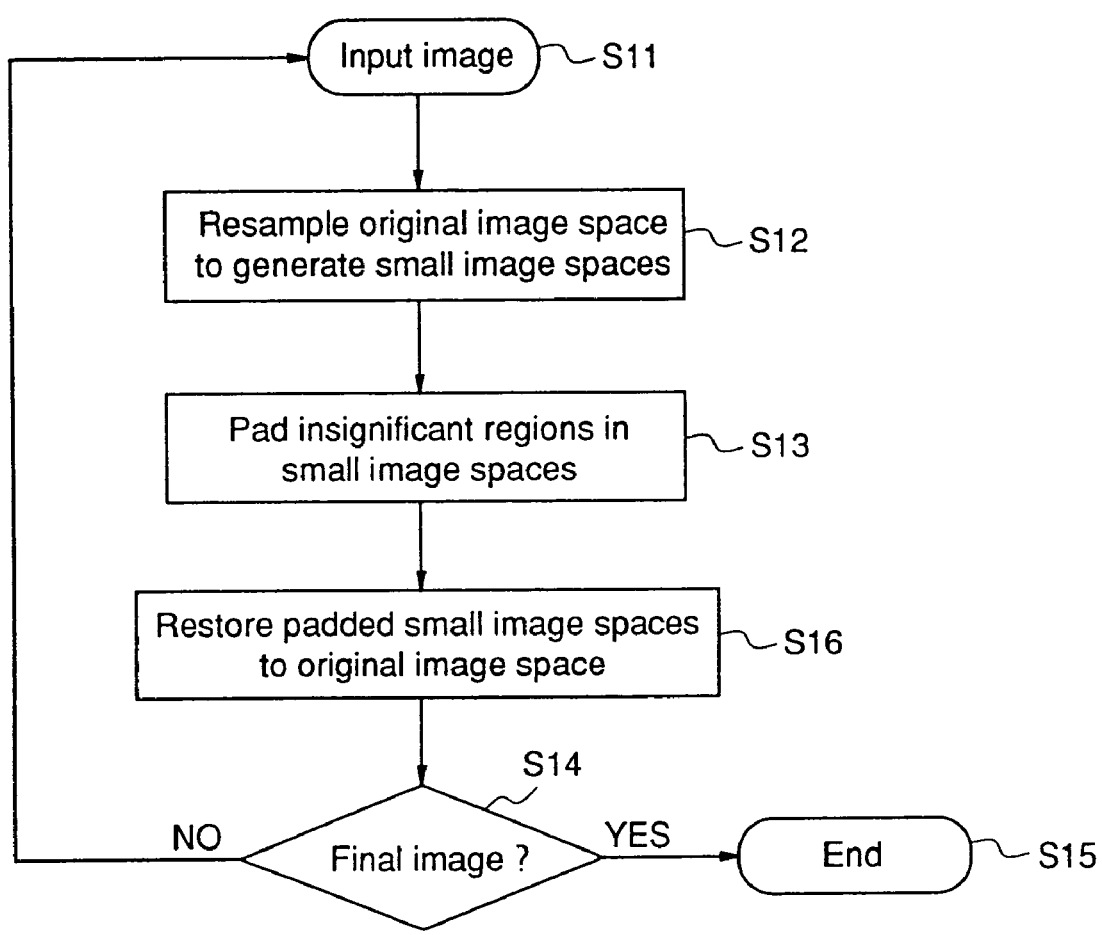
FIG. 4 is a diagram showing a flow of image processing in a digital image padding method according to the modification 1 if the first embodiment of the present invention.

FIG. 4 is a diagram for explaining a digital image padding method according to a modification 1 of the first embodiment of the present invention and shows flow of image processing in the padding method.

In this digital image padding method of the modification 1 of the first embodiment, a process for merging pixels in step S16 is added to the steps S11–S15 in the digital padding method of the first embodiment in FIG. 1.

In step S16, all the pixels in the small image spaces 405 and 406 which have been padded in step S13 are rearranged so that they have the same arrangement as the original image space corresponding to the input digital image signal, to form a merged image space 407 which is as large as the original image space 301 (FIG. 3(c)).

Specifically, pixels in the small image space 405 obtained by padding the small image space 401 are disposed where odd-numbered pixel columns and odd-numbered pixel rows intersect in the merged image space which is twice as large as the small image space, and pixels in the small image space 405 obtained by padding the small image space 403 are disposed where even-numbered pixel columns and odd-numbered pixel rows intersect in the merged image space. Further, pixels in the small image space 406 obtained by padding the small image space 402 are disposed where odd-numbered pixel columns and even-numbered pixel rows intersect in the merged image space 407, and pixels in the small image space 406 obtained by padding the small image space 404 are disposed where even-numbered pixel columns and even-numbered pixel rows intersect in the merged image space.

In this modification 1 thus constructed, every other pixels are extracted in the horizontal direction and pixels on every other pixel row are extracted in the vertical direction of the original image space 301 corresponding to the input digital image signal, and the extracted plural pixels are rearranged, to form the 4 small image spaces 401–404, to which padding of pixel values is performed, and thereafter, pixels in the padded small image spaces 405 and 406 are rearranged, to form the merged image space 407 of the same pixel arrangement as the original image space 301. Therefore, image processing such as coding is performed to the padded merged space in the same manner that an unpadded original image space is processed without the necessity of changing processing of an image signal after padding depending on padding.

Modification 2 of First Embodiment

Figure 5:
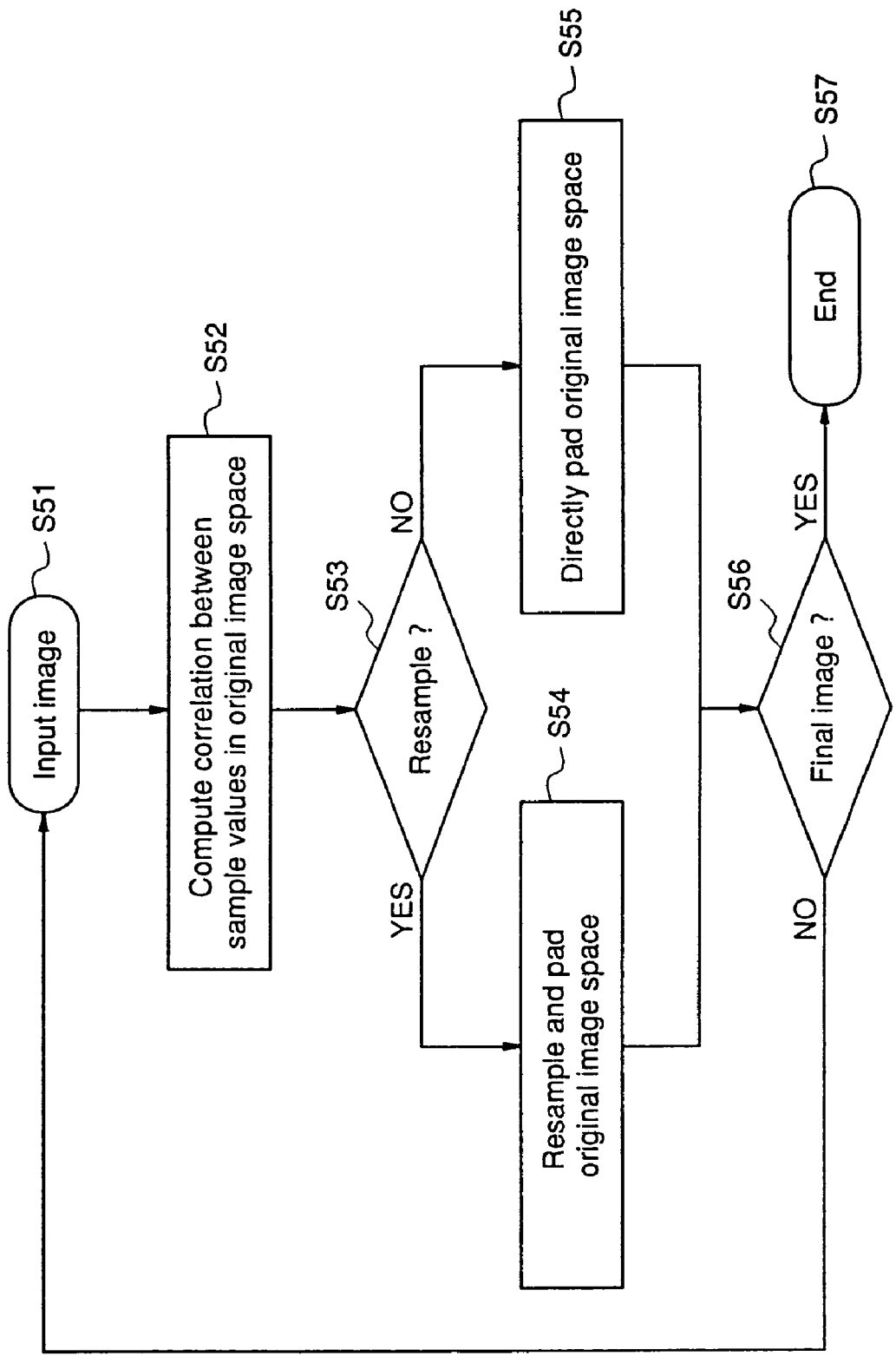
FIG. 5 is a diagram showing a flow of image processing in a digital image padding method according to a modification 2 of the first embodiment of the present invention.

FIG. 5 is a diagram showing a digital image padding method according to modification 2 of the first embodiment of the present invention, and shows flow of image processing in the padding method.

The digital image padding method of the modification 2 of the first embodiment, as shown in FIG. 5, includes step S52 in which the degree of correlation of pixel values between adjacent pixel columns is evaluated for an original image space formed by a resampled input digital image signal, step S53 in which it is decided whether or not the original image space is resampled to form plural small image spaces according to the evaluation result, step S54 in which the original image space is resampled and then the small image space is padded, and step S55 in which the original image space is directly padded.

Subsequently, operation and effect will be described.

In the padding method of the modification 2 of the first embodiment, in step S51, a digital image forming a prescribed original image space where pixels are arranged in a matrix is input. Subsequently in step S52, the degree of correlation of pixel values between adjacent pixel columns is computed for the original image space. More specifically, in this modification, differences of sample values of pixels between each pair of adjacent odd-numbered and even-numbered pixel columns in the original images space are computed, and absolute values of the differences are added for each pair of odd-numbered and even-numbered pixel columns, to generate first evaluation values.

In addition, differences (first differences) of sample values between each pair of adjacent odd-numbered pixel columns and differences (second differences) of sample values between each pair of adjacent even-numbered pixel columns are computed, and absolute values of these first and second differences are added for each pair of even-numbered pixel columns and for each pair of odd-numbered pixel columns, to generate second evaluation values.

In step S53, comparison is made between the first and second evaluation values. From this comparison result, when the second evaluation values are smaller than the first evaluation values, that is, correlation of pixel values between the odd-numbered and even-numbered pixel columns is lower than correlation of pixel values between odd-numbered pixel columns and between even-numbered pixel columns, in step S54, the original image space is resampled, and then padded. Specifically, pixels on every other pixel column are extracted in the original image space, to generate a first small image space comprising pixels forming odd-numbered pixel columns and a second small image space comprising pixels forming even-numbered pixel columns, and then padding of pixels is performed to each small image space.

On the other hand, when the second evaluation values are not smaller than the first evaluation values from the comparison result in step S53, in step S55, the original image space is padded without resampling. The padding herein is identical to padding in step S13 of the first embodiment.

Thus, in the modification 2 of the first embodiment, correlation of pixel values between adjacent pixel columns is decided for the original image space corresponding to the input image signal, and according to the decision result, padding is performed to the small image space in which the original image space has been resampled or is directly performed to the original image space. Therefore, it is possible to perform padding to an input digital image signal according to its quality, and to avoid performing padding to the original image space where there is low correlation of pixel rows between adjacent pixel columns. As a result, padding in coding or decoding process of an image signal can be performed without degrading coding efficiency.

While in this modification 2 of the first embodiment, correlation of pixel values between pixel columns is decided, and the original image space is divided into the small image space composed of odd-numbered pixel columns and a small image space composed of even-numbered pixel columns, the correlation of pixel values may be decided between pixel rows in the original image space. Also in this case, as in the modification 2 of the first embodiment, two evaluation values are computed and comparison is made between them to make decision, and then according to the decision result, it is decided whether or not resampling is performed to the original image space in the vertical direction prior to padding, that is, it is decided whether or not the original image space is divided into the small image space (odd-numbered field) composed of odd-numbered pixel rows and the small image space (even-numbered field) composed of even-numbered pixel rows.

Besides, while in this modification 2 of the first embodiment, pixels on every other pixel column (or every other pixel row) are extracted in the original image space, and comparison is made for correlation of sample values between extracted pixel columns (or pixel rows), pixels may be extracted every (N+1)-th (N=1, 2, 3, . . . ) pixel in the vertical (or horizontal) direction of the original image space, correlation between the extracted pixels may be computed to generate plural evaluation values, and according to largeness of these evaluation values, it may be decided whether or not resampling is performed every (N+1)-th pixel in the vertical (or horizontal) direction prior to padding.

Further, a function used in computing evaluation values from sample values of pixels extracted in the original image space, is not limited to a function in which sum of absolute values of differences between sample values is used as evaluation values, and the other functions may be employed. Moreover, the evaluation values may be computed only from significant samples.

Modification 3 of First Embodiment

Figure 6:
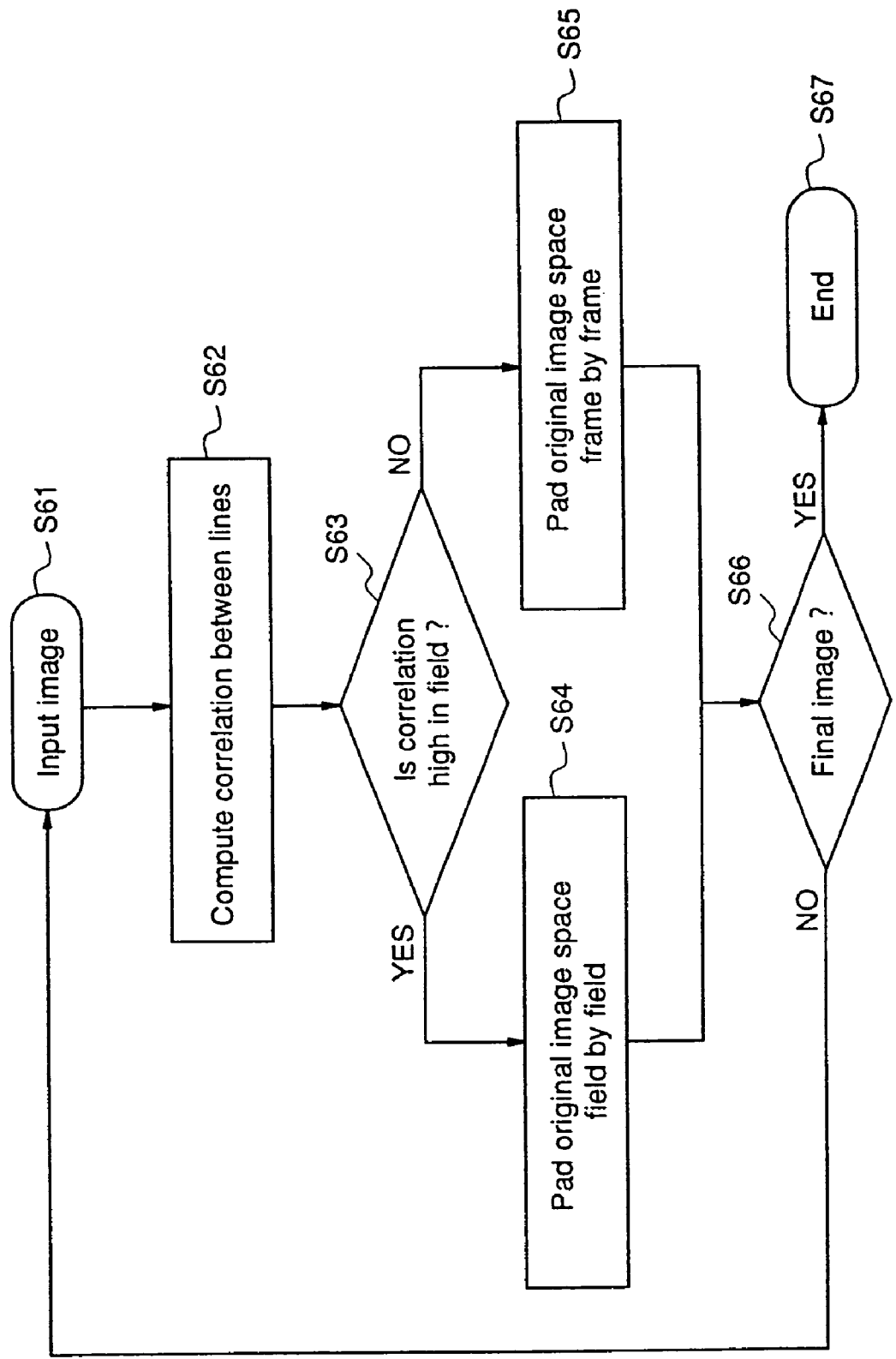
FIG. 6 is a diagram showing a flow of image processing in a digital image padding method according to a modification 3 of the first embodiment of the present invention.

FIG. 6 is a diagram showing a digital image padding method according to a modification 3 of the first embodiment and shows flow of image processing in the padding method.

The digital image padding method of the modification 3 of the first embodiment, as shows in FIG. 6, includes step S62 in which the degree of correlation of pixel values between adjacent scanning lines (pixel rows) is evaluated for an original image space formed by a sampled input digital image signal, step S63 in which the degree of correlation of pixel values in fields of the original image space is decided, step S64 in which the original image space is resampled to form a small image space corresponding to an odd-numbered field and a small image space corresponding to an even-numbered field, and padding is performed for each small image space, i.e., field by field, and a step S65 in which the original image space is padded frame by frame.

Subsequently, operation and effects will be described.

In the padding method of the modification 3 of the first embodiment, in step S61, a digital image signal forming a prescribed original image space in which pixels are arranged in a matrix input. In this modification 3, suppose that the digital image signal corresponds to the interlaced image, and forms the image space 301 shown in FIG. 2.

Subsequently in step S62, correlation of pixel values between scanning lines in the original image space is computed. Specifically, by the method described by means of FIG. 5, first evaluation values indicating correlation of pixel values between odd-numbered and even-numbered lines in the original image space are generated, and second evaluation values indicating correlation of pixel values between odd-numbered lines and between even-numbered lines in the original image space are generated.

Then in step S63, comparison is made between the first and second evaluation values, to decide whether or not correlation of pixel values in fields is higher than correlation of pixel values in a frame.

When decided that the second evaluation values are smaller than the first values, that is, correlation of pixel values in the fields is higher than correlation of pixel values in the frame, in step S64, the original image space formed by the digital image signal is padded field by field. In other words, a small image space composed of odd-numbered lines and a small image space composed of even-numbered lines are generated, and then padding is performed for each small image space (field). On the other hand, when decided that the second evaluation values are not smaller than the first values, in step S65, the original image space is padded frame by frame, that is, with the odd-numbered lines and the even-numbered lines merged.

Figure 7:
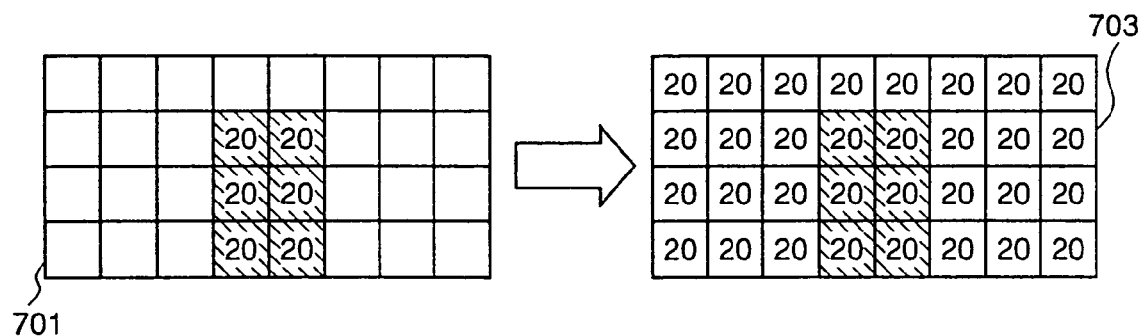
FIG. 7 is a diagram showing padding of pixels values in the digital image padding method according to the modification 3 of the first embodiment.
Figure 7:
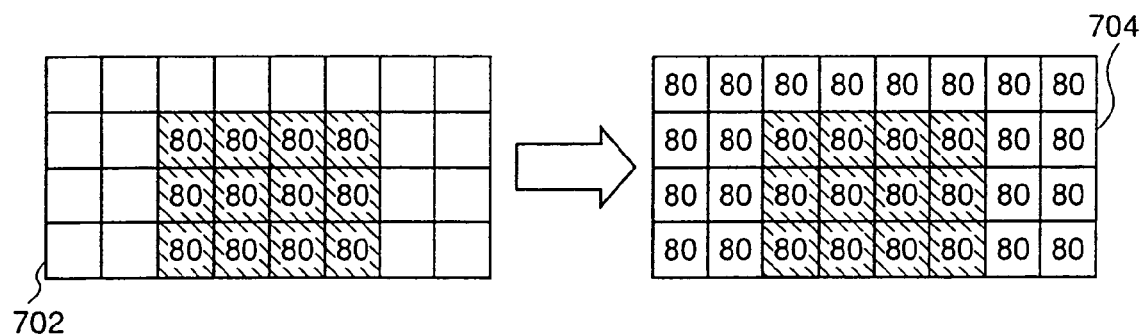

FIG. 7 is a diagram for explaining field by field padding of the original image space 301 in FIG. 2. FIG. 7(*a*) shows a small image space 701 corresponding to the odd-numbered field in the original image space 301, and a small image space 703 obtained by padding the small image space 701. FIG. 7(*b*) shows a small image space 702 corresponding to an even-numbered field in the original image space 301, and shows a small image space 704 obtained by padding the small image space 702.

As can be seen from FIG. 7, the small image spaces 701 and 702 can be padded without introducing high-frequency components into them.

In this modification 3 of the first embodiment, it is decided-whether the original image space corresponding to the input image digital image signal is padded field by field or frame by frame, and padding of pixel values is performed to the original image space in one of these units. Therefore, it is possible to perform padding to the interlaced image without degrading efficiency in coding of the image signal of to the interlaced image.

Embodiment 2

Figure 8:
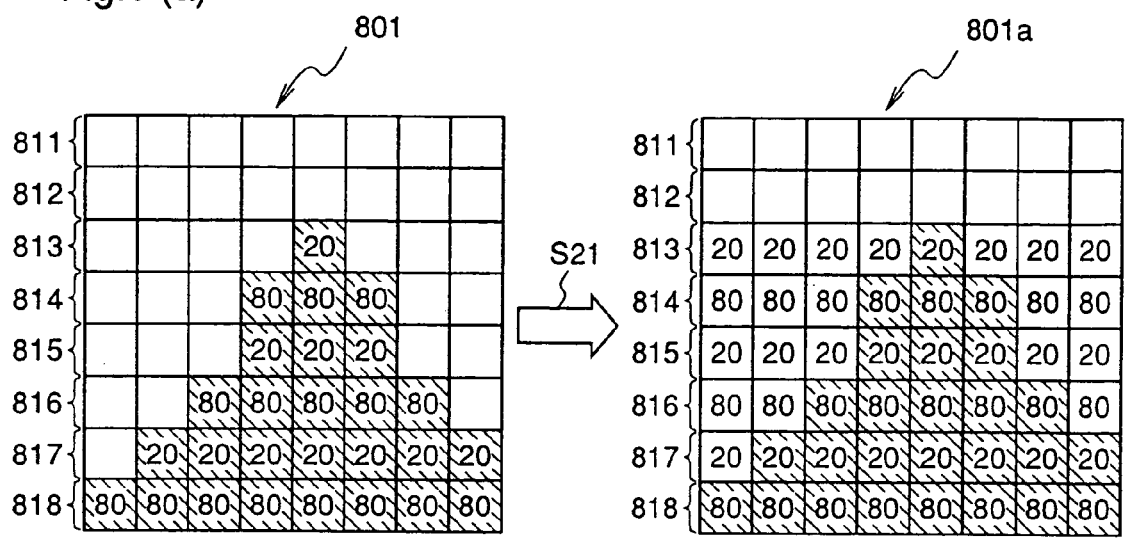
FIGS. 8(a) and 8(b) are diagrams showing padding of pixels values in a digital image padding method according to a second embodiment of the present invention.
Figure 8:
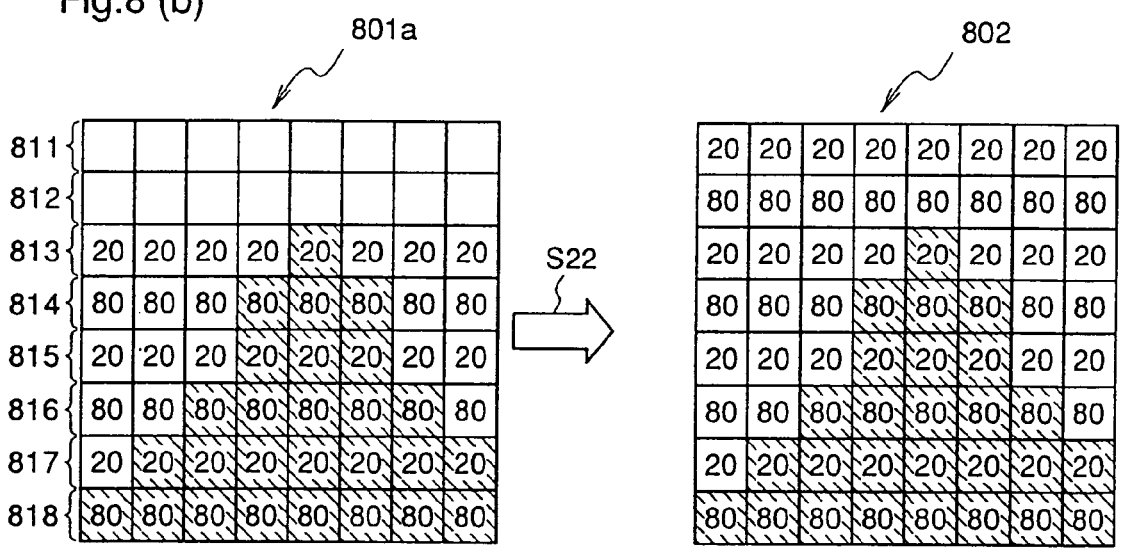

FIG. 8 is a diagram for explaining a digital image padding method according to a second embodiment of the present invention, and shows an original image space formed by a digital image signal to be padded, and a padded image space in which the original image space has been padded.

In the digital image padding method of the second embodiment, the step S12 for resampling and step S13 for padding by the digital image padding method of the first embodiment, are replaced by a step in which an original image space 801 corresponding to a digital image signal is directly padded, that is, sample values of insignificant pixels are replaced with padding values obtained from sample values of significant pixels according to a prescribed rule. In this embodiment, used as the significant pixels used in generating the padding values are, pixels which are adjacent to insignificant pixels in the horizontal direction and pixels which are adjacent thereto one pixel spaced apart therefrom in the vertical direction of the original image space.

Specifically, the digital image padding of the second embodiment includes a first replacement step S21 (see FIG. 8(*a*)) for sequentially replacing sample values of insignificant pixels in the horizontal direction and a second replacement step S22 (see FIG. 8(*b*)) for replacing sample values of insignificant pixels in the vertical direction. In the second replacement step S22, sample values of insignificant pixels in an image space 801*a* obtained through the first replacement step S21, are replaced with sample values of pixels on a pixel row adjacent to a pixel row comprising the insignificant pixels, one pixel row spaced apart therefrom.

Subsequently, operation and effects will be described.

Since there is low correlation of pixel values between an odd-numbered line (pixel row) and an even-numbered line (pixel row) in the original image space 801, effectiveness is provided by the method of dividing the original image space 801 into the small image space composed of odd-numbered lines and the small image space composed of even-numbered lines, and padding respective small image spaces, as already described in the first embodiment. On the other hand, for an image signal forming an original image space with high correlation between odd-numbered lines and between even-numbered lines, there is another effective method, in which sample values to be padded, i.e., insignificant pixels in the original image space, are replaced with sample values of significant pixels located one pixel spaced apart therefrom in the vertical direction (one pixel is located adjacently to the other pixel with one pixel interposed between them in the vertical direction).

So, in the digital padding method of the second embodiment, as shown in FIG. 8(*a*), sample values of insignificant pixels are replaced with sample values of significant pixels adjacent thereto, for insignificant pixels aligned in the horizontal direction, in the order inward to outward of the original image space 801 (first replacement step).

Subsequently, as shown in FIG. 8(*b*), sample values of insignificant pixels on a pixel row 812 are replaced with sample values of pixels on a pixel row 814 adjacent thereto with a pixel row 813 interposed between them in the image space 801*a* obtained through the first replacement step S21, and sample values of insignificant pixels on a pixel row 811 are replaced with sample values of pixels on the pixel row 813 adjacent thereto with the pixel row 812 interposed between them in the image space 801*a* (second replacement step S22).

In the digital image padding method of the second embodiment, the same effects as provided by the digital image padding method of the first embodiment in which the original image space corresponding to the input image signal is resampled, and the resulting image space is padded, are obtained. Specifically, even for the case of the digital image signal corresponding to the interlaced image, it is possible to avoid introduction of high-frequency components into the digital image signal of the original image space in padding process, and hence, differential coding or differential decoding of the interlaced image or the like can be performed with high efficiency while suppressing degradation of coding efficiency resulting from padding.

While in the second embodiment, the sample values of the significant pixels located one sample spaced apart from the insignificant pixels in the vertical direction are used as the padding pixel values in the replacement step S22, the sample values for the padding values are not limited thereto, and sample values of significant pixels located N samples spaced apart from the insignificant pixels in the vertical direction may be generally used in padding of sample values of the insignificant pixels.

In addition, while in the second embodiment, sample values of insignificant pixels are sequentially replaced first in the horizontal direction, and then every other sample values of insignificant pixels are replaced in the vertical direction, sample values of insignificant pixels may be sequentially replaced first in the vertical direction and then every other sample values of insignificant pixels are replaced in the horizontal direction. In this case, it is possible to effectively perform padding to a progressive image having a vertical stripe pattern.

Hereinafter, description is given of an image coding apparatus using the digital image padding method of the present invention in a third embodiment and an image decoding apparatus using the digital image padding method in a fourth embodiment.

Embodiment 3

Figure 9:
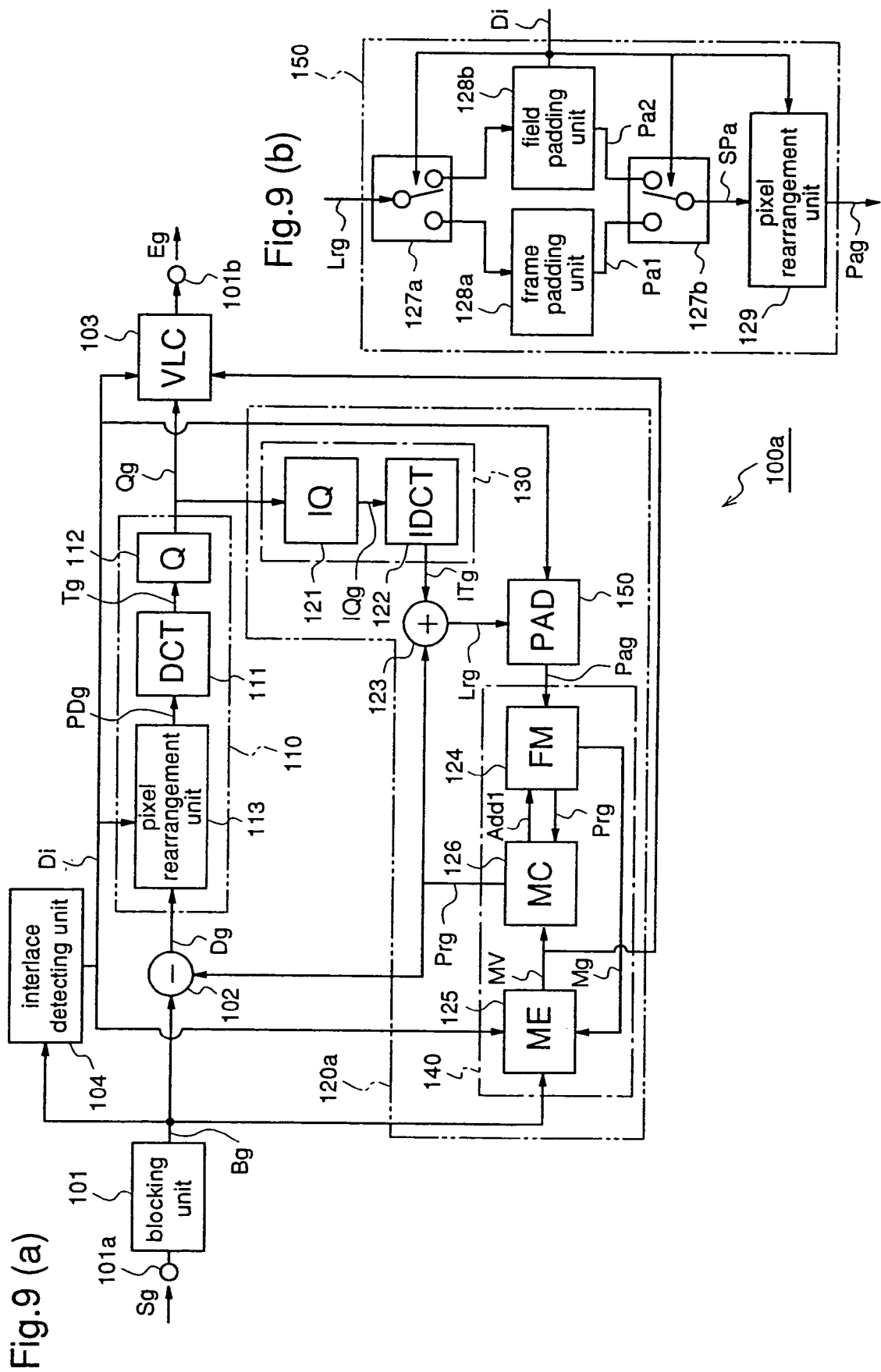
Figure 10:
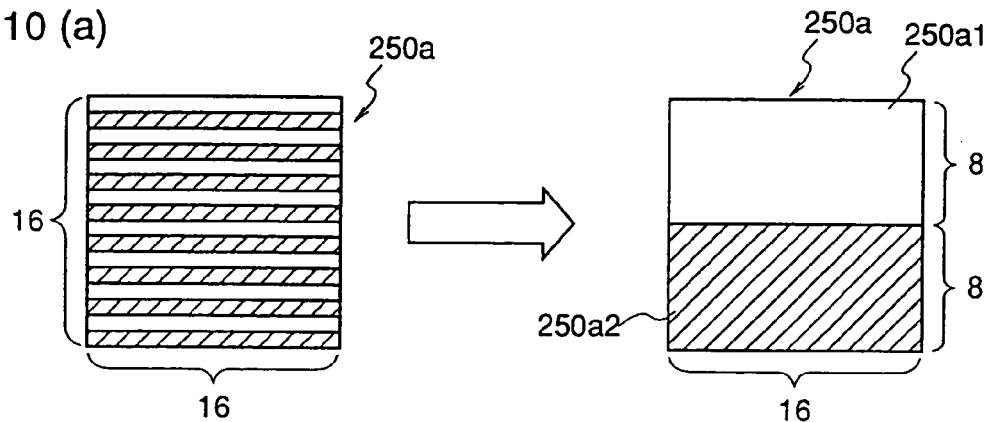
Figure 10:
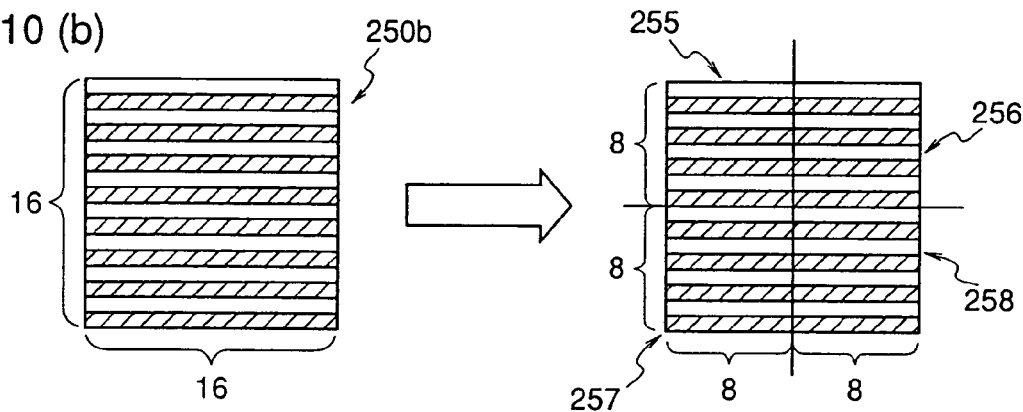
Figure 10:
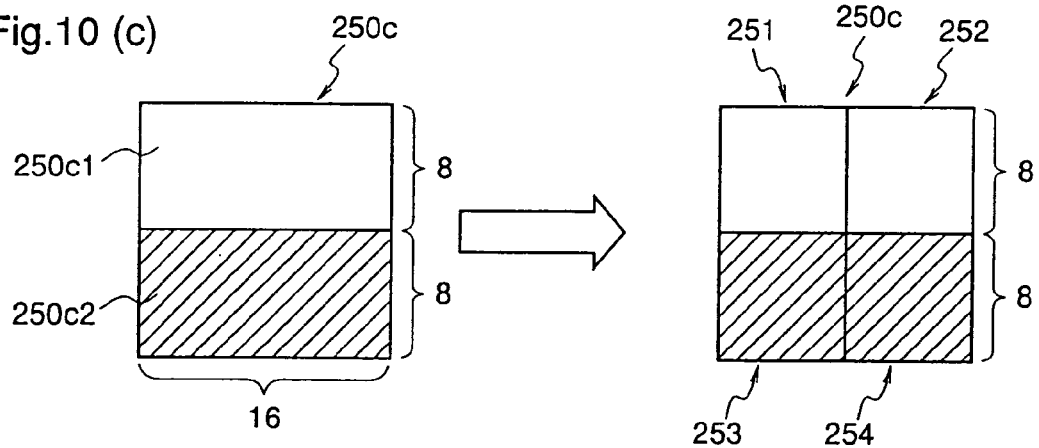
Figure 10:
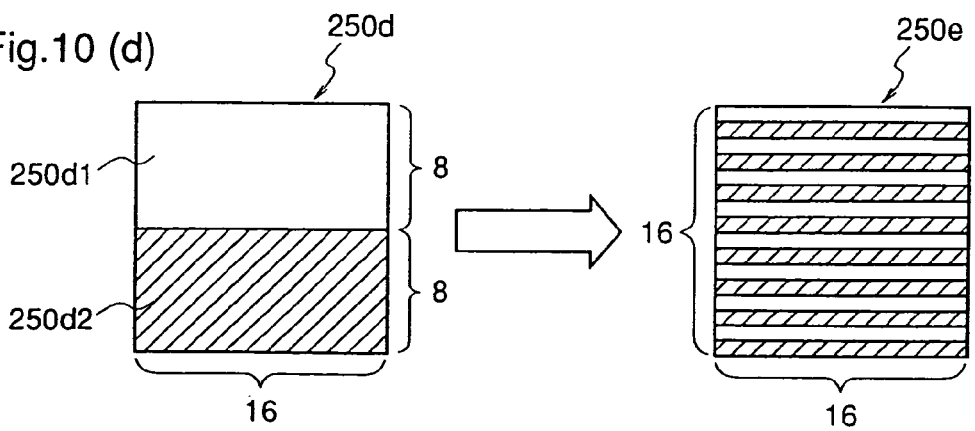

FIG. 9 is a block diagram showing the image coding apparatus as an image processing apparatus according to the third embodiment of the present invention, wherein FIG. 9(a) shows an entire construction of the image coding apparatus and FIG. 9(b) shows a padding section of the image coding apparatus.

An image coding apparatus 100a of the third embodiment includes a blocking unit 101 for dividing an input digital image signal Sg supplied to an input terminal 101a into signals corresponding to blocks each comprising 16×16 pixels as coding units and outputting the resulting image signal (hereinafter referred to as a blocked image signal) Bg, an interlace detecting unit 104 for distinguishing between the interlaced image and the progressive image on the basis of an output Bg of the blocking unit 101, for an image corresponding to the digital image Sg, and outputting a sample identifier Di according to the result, and a predicting section 120a for producing a prediction image Prg of a target block to-be-coded.

The image coding apparatus 100a further includes a subtracter 102 for outputting difference between the blocked image signal Bg of the target block and the prediction signal Prg as a difference signal (prediction error signal) Dg, a data compressing device 110 for performing information compression to the output Dg of the subtracter 102 according to the sample identifier Di and outputting a compressed difference signal Qg, and a variable length encoder (VLC) 103 for performing variable length coding to the output Qg of the data compressing device 110 and outputting a coded image signal Eg.

The data compressing device 110 includes a pixel rearrangement unit 113 for rearranging pixels of a difference image signal formed by the difference signal Dg according to the sample identifier Di, a DCT unit 111 for performing discrete cosine transform to an output PDg of the pixel rearrangement unit 113, and a quantizer 112 for quantizing an output Tg of the DCT unit 111 and outputting quantization coefficients as the compressed difference signal Qg. The discrete cosine transform is performed for each of 4 blocks each comprising 8×8 pixels into which the block comprising 16×16 pixels is divided. Where the rearrangement has been performed, a block 250c is divided into small blocks 251–254 as shown in FIG. 10(c), whereas where the rearrangement has not been performed, a block 250b is divided into small blocks 255–258 as shown in FIG. 10(b).

The pixel rearrangement unit 113 is used for rearranging pixels in the image space 250 corresponding to the difference signal Dg to generate a rearranged image space 250a according to the sample identifier Di as shown in FIG. 10(a). In this rearranged image space 250a, an upper region 250a1 comprising 16×8 pixels comprises pixels on odd-numbered pixel rows and a lower region 250a2 comprising 16×8 pixels comprises pixels on even-numbered pixel rows in the image space 250.

The predicting section 120a includes a data expanding device 130 for performing expansion to the output Qg of the data compressing device 110 and outputting an expanded difference signal Itg, and an adder 123 for adding the expanded difference signal Itg to the prediction image signal Prg and outputting a restored image signal Lrg. The data expanding device 130 includes an inverse quantizer 121 for inversely quantizing the output Qg of the data compressing device 110, and an IDCT unit 122 for performing inverse DCT to an output IQg of the inverse quantizer 121 by transforming data in a frequency domain into data in a spatial domain, and outputting the expanded difference signal Itg.

The predicting section 120a further includes a padding device 150 for performing padding to the restored image signal Lrg from the adder 123 according to the sample identifier Di, and a prediction signal producing device 140 for producing the prediction image signal Prg from a padded restored image signal Pag.

The prediction signal producing device 140 includes a frame memory 124 for storing the output Pag of the padding device 150, a motion detecting unit (ME) 125 for computing a motion vector MV of the target block based on the image data Mg stored in the frame memory 124, the blocked image signal Bg, and the sample identifier Di and outputting the MV, and a motion compensating unit (MC) 126 for generating an address Add1 of the frame memory 124 according to the motion detecting unit 125 and outputting an image signal in a memory area of the address Add1 as the prediction signal Prg. The motion detecting unit 125 is used for generating a motion vector of a frame and a motion vector of a field according to the sample identifier Di. The motion vector MV and the sample identifier Di are variable length coded by the variable length encoder 103 together with the compressed difference signal Qg.

As shown in FIG. 9(b), the padding device 150 includes a frame padding unit 128a for padding the output Lrg of the adder 123 frame by frame, a field padding unit 128b for padding the restored image signal Lrg from the adder 123 field by field, a primary switch 127a provided at a primary stage of these padding units, for supplying one of the padding units with the restored image signal Lrg from the adder 123, a secondary switch 127b provided at a next stage of these padding units, for selecting one of outputs Pa1 and Pa2 of respective padding units according to the sample identifier Di, and a pixel rearrangement unit 129 for receiving a padded restored signal as a selected signal Spa from the secondary switch 127b and rearranging pixels in an image space formed by the padded restored image signal.

As shown in FIG. 10(b), the frame padding unit 128a is used for performing padding the restored image signal Lrg of 4 small blocks (8×8 pixels) 255–258 in an image space 250b (16×16 pixels) corresponding to the restored image signal at a time. As shown in FIG. 10(c), the field padding unit 128b is used for performing padding to the restored image signal Lrg of small blocks 251 and 252 composed of first field lines in an upper region 250c1 of an image space 250c of the restored image signal at a time, and padding the signal Lrg of small blocks 253 and 254 composed of second field lines in a lower region 250c2 of the image space 250c at a time. The pixel rearrangement unit 129 is used for rearranging pixels in an image space 250d corresponding to a padded restored image signal from the field padding unit 128b and outputting the image signal Pag corresponding to a merged restored image space 250e where 8 pixel rows in the upper region 250d1 and 8 pixel rows in the lower region 250d2 of the image space 250d are alternately arranged.

Figure 11:
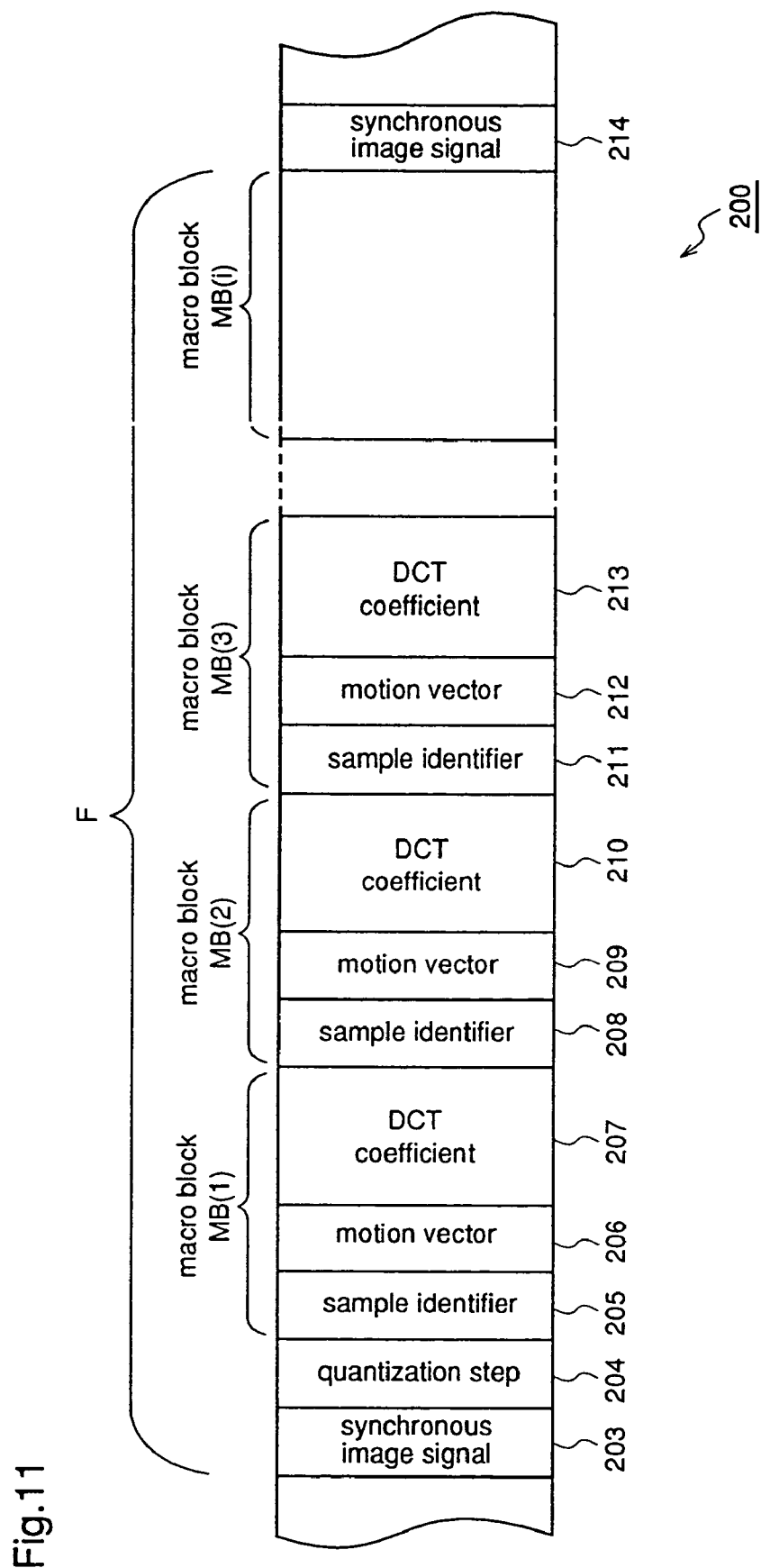
FIG. 11 is a diagram showing a data structure of a coded image signal output from the image coding apparatus of the third embodiment.

Next, a data structure of a coded image signal output from the image coding apparatus 100a will now be described. FIG. 11 schematically shows a data structure of the coded image signal.

In this bit stream 200, a bit string F corresponding to a frame image comprises a synchronous image signal 203 indicative of a starting point of a code string, a quantization step value 204 indicative of a quantization scale (quantization step) for use by quantization in coding process, and data D(1), D(2), D(3), ..., D(i), corresponding to blocks (macroblocks) MB(1), MB(2), MB(3), ..., MB(i) each comprising 16×16 pixels. Reference numerals 205, 208, and 211 designate sample identifiers each indicating whether or not correlation between pixels in fields is higher than correlation between pixel values in a frame. Reference numerals 206, 209, and 212 designate variable length coded motion vectors. Reference numerals 207, 210, and 213 designate DCT coefficients of subblocks each comprising 8×8 pixels of each block. The data D(1), data D(2), and D(3) corresponding to respective macro blocks comprises, the sample identifier 205, the motion vector 206, and the DCT coefficient 207, the sample identifier 208, the motion vector 209, and the DCT coefficient 210, and the sample identifier 211, the motion vector 212, and the DCT coefficient 213, respectively. In FIG. 11, reference numeral 214 designates a synchronous image signal of a frame subsequent to the frame F.

In this embodiment, the synchronous image signals 203 and 214 are respectively disposed at the head of the corresponding bit streams of frame images, and following the synchronous image signal 203, aligned are the quantization step value 204 for use by quantization, the sample identifier 205, the motion vector 206, and the DCT coefficient 207 as compressed data. The synchronous image signal 203 indicates the head of the compressed data of the image 200, and is represented by unique 32 bits. The quantization step 204 is a parameter of 5 bits used for inversely quantizing the DCT coefficient.

Subsequently, operation will be described.

When the digital image signal Sg is input to the image coding apparatus 100a, the blocking unit 101 performs blocking so that the digital image signal Sg is divided into signals corresponding to image spaces (blocks) each comprising 16×16 pixels into which one frame is divided, to be output. The subtracter 102 computes difference between the blocked image signal Bg and the prediction image signal Prg from the predicting section 120a and outputs the resulting difference signal (prediction image signal) Dg to the data compressing means 110. At this time, the interlace detecting unit 104 identifies an interlaced image based on the image signal of each block (blocked image signal) Bg, for the input image, and outputs the sample identifier Di according to the decision result.

When the difference signal Dg is supplied to the data compressing device 110, the pixel rearrangement unit 113 subjects the difference signal Dg to rearrangement according to the sample identifier Di. Specifically, where the digital image signal corresponds to the interlaced image, the difference signal Dg is subjected to rearrangement and input to the DCT unit 111, whereas where the digital image signal corresponds to the progressive image, the difference signal Dg is directly input to the DCT unit 111 without rearrangement. The DCT unit 111 performs DCT to the output PDg of the pixel rearrangement unit 113. More specifically, for the block corresponding to the interlaced image, the block is divided into subblock as shown in FIG. 10(c), and for the block corresponding to the progressive image, the block is divided into subblocks as shown in FIG. 10(b), and then the output PDg is subjected to DCT for each subblock. The quantizer 112 quantizes an output Tg of the DCT unit 111 by a quantization step and outputs quantization coefficients Qg of the difference signal to the variable length encoder 103 and the information expanding section 130.

The information expanding section 130 expands and converts the compressed difference signal Qg of the target block into the expanded difference signal ITg. More specifically, in this embodiment, the inverse quantizer 121 inversely quantizes the compressed difference signal Qg, and further, the inverse discrete cosine transform (IDCT) unit 122 subjects the output IQg of the quantizer 121 to IDCT by transforming a signal in a frequency domain into a signal into a signal in a spatial domain.

The adder 123 adds the expanded difference signal ITg to the prediction image signal Prg and outputs the restored image signal Lrg to the padding means 150.

In the padding device 150, the restored image signal Lrg is supplied to one of the frame padding unit 128a and the field padding unit 128b through the switch 127a. At this time, switching of the switch 127a is controlled according to the sample identifier Di. Where a value of the sample identifier Di is 1, that is, there is high correlation between pixels in the fields, the restored image signal Lrg is supplied to the field padding unit 128b through the switch 127a and is subjected to intra-field padding therein. Specifically, as shown in FIG. 10(c), padding is performed to the restored image signals of small blocks 251 and 252 composed of lines of the first field of the restored image space 250c at a time, and the restored image signals of small blocks 253 and 254 composed of lines of the second field of the restored image space 250c at a time.

On the other hand, where the value of the sample identifier Di is 0, that is, where there is high correlation between pixel values in the frame, the restored image signal Lrg is input to the frame padding unit 128a through the switch 127a and is subjected to intra-frame padding therein. Specifically, as shown in FIG. 10(b), padding is performed to the small blocks 255–258 of the restored image space 250b at a time.

Thus padded restored image signals Pa1 and Pa2 are sent to the pixel rearrangement unit 129 through the primary switch 127b. The pixel rearrangement unit 129 rearranges pixels of the first field and pixels of the second field so that they have pixel rearrangement of the interlaced image according to the sample identifier Di, for the macroblock 250d which has been padded field by field. Specifically, pixels in the restored image space 250d in FIG. 10(d) are rearranged so that pixel rows in the upper region 250d1 and pixel rows in the lower region 250d2 are alternately disposed, resulting in an image signal forming an image space 250e of the same pixel arrangement as an image space formed by the difference signal Dg. On the other hand, for the block which has been padded frame by frame, pixels are not rearranged by the pixel rearrangement unit 129.

The padded restored image signal Pag which has been thus rearranged is stored in the frame memory 124 of the prediction signal producing section 140.

In the prediction signal producing section 140, the image signal Bg of the target block is input to the motion detection unit 125, and simultaneously, the padded restored image signal Pag is read from the frame memory 124 onto the motion detecting unit 125 as an image signal of a coded previous frame.

The motion detecting unit 125 detects a region of the previous frame including an image signal which has the smallest error between the image signal Bg of the target block and the same as a prediction region and, outputs motion displacement information (motion vector) MV indicating a position of the prediction region, by block matching or the like. The motion vector MV is sent to the motion compensating unit 126, which generates an address Add1 of the frame memory 124 from the motion vector, and reads an image signal corresponding to the prediction region of the previous frame using the address Add1 as the prediction image signal Prg.

Further, the motion vector MV of the target block, the sample identifier Di, and the coded difference signal Qg are supplied to the variable length encoder 103, where they are converted into the corresponding to variable length codes, and output from an output terminal 101b as the coded image signal Eg.

Thus, in the third embodiment, the predicting section 120b performs padding depending upon whether the digital image signal corresponds to the interlaced image or the progressive image. Therefore, it is possible to perform differential coding to the interlaced image with high efficiency.

Subsequently, modifications of the third embodiment will be described.

Modification 1 of Third Embodiment

Figure 12:
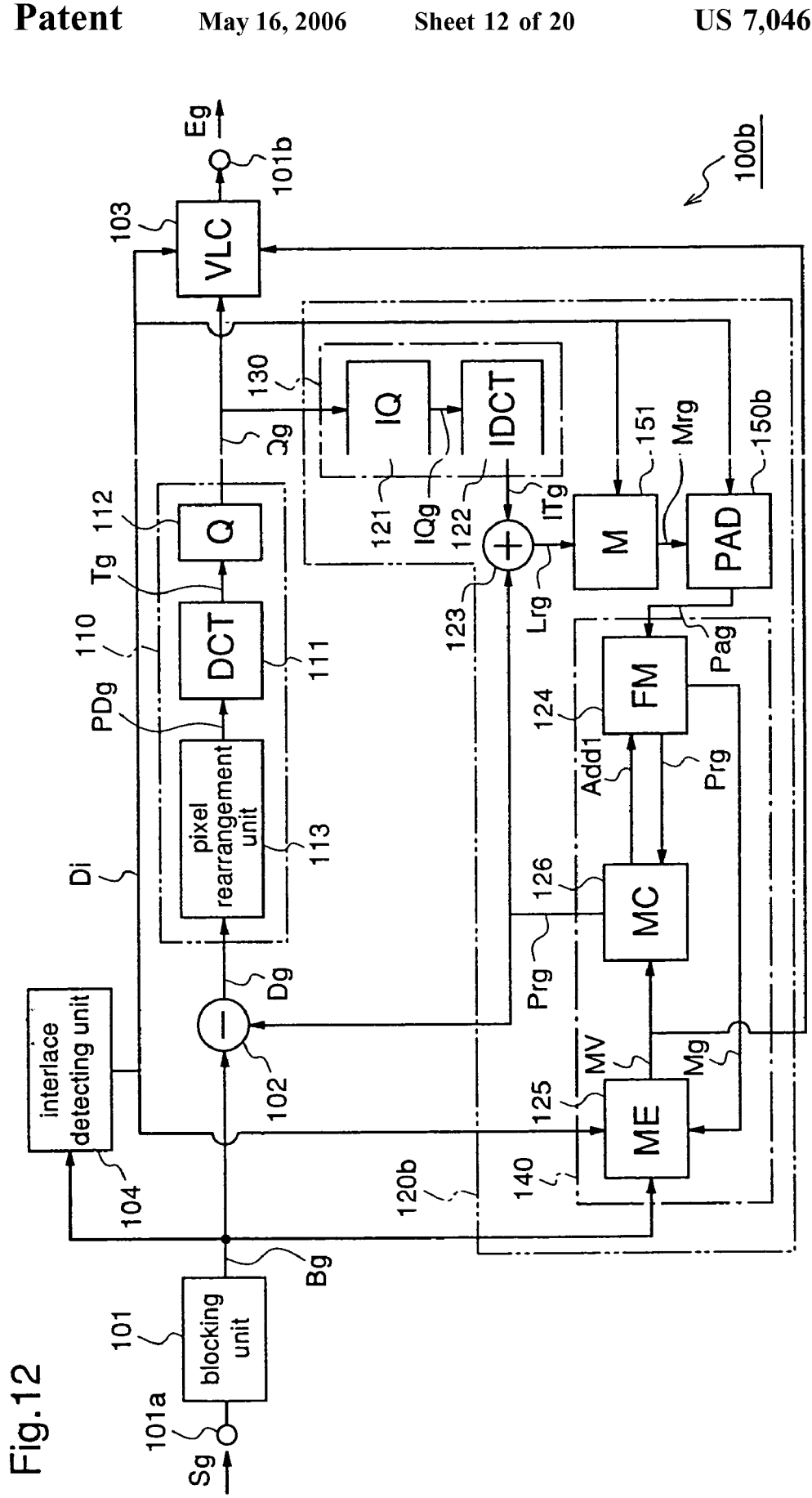
FIG. 12 is a block diagram showing an image coding apparatus according to a modification 1 of the third embodiment.

FIG. 12 is a diagram showing an image coding apparatus according to a modification 1 of the third embodiment.

In an image coding apparatus 100b of the modification 1 of the third embodiment, only a predicting section 120b differs from that of the image coding apparatus 100a of the third embodiment, and in the predicting section 120b of the image coding apparatus 100b, the padding device 150 of the predicting section 120a of the first embodiment is replaced with a merging unit 151 which performs merging wherein pixels in an image space formed by the restored image signal Lrg from the adder 123 are rearranged, and a padding device 150b which performs padding to an output of the merging unit 151.

The merging unit 151 is, as shown in FIG. 10(d), used for rearranging pixels by alternately arranging pixels rows in the upper region 250d1 and pixel rows in the lower region 250d2 of the image space 250d. The padding device 150b includes the primary and secondary switches 127a and 127b, the frame padding unit 128a, and the field padding unit 128b of the padding device 150 of the third embodiment, the field padding unit 128b performing padding by the digital image padding method of the second embodiment. The other components are identical to those of the third embodiment.

In the modification 1 of the third embodiment thus constructed, the same effects as provided by the third embodiment are obtained.

Modification 2 of Third Embodiment

FIG. 13 is a diagram showing an image coding apparatus according to a modification of the third embodiment of the present invention, wherein FIG. 13(a) shows an entire construction of the image coding apparatus and FIG. 13(b) shows a padding device 150c of the data compressing device 110c of the image coding apparatus.

In an image coding apparatus 100c of the modification 2 of the third embodiment, only a data compressing device 100c differs from that of the image coding apparatus 100a of the third embodiment, and the data compressing device 110c of the image coding apparatus 10c is provided with a padding device 150c which performs padding to an output PDg of the pixel rearrangement unit 113 between the pixel rearrangement unit 113 and the DCT unit 111 at the next stage of the data compressing device 110 of the third embodiment.

The padding device 150c includes a frame padding unit 158a for performing padding to the output PDg of the rearrangement unit 113 frame by frame, a field padding unit 158b for performing padding to the output PDg of the rearrangement unit 113 field by field, a primary switch 157a provided at a previous stage of these padding units, for supplying one of these padding units with the output PDg according to the sample identifier Di, and a secondary switch 157b provided at a next stage of these padding units, for selecting one of outputs PDg 1 and PDg 2 of the padding units according to the sample identifier Di. Constructions of the frame padding unit 158a and the field padding unit 158b are identical to those of the frame padding unit 128a and the field padding unit 128b of the third embodiment.

In this modification 2 of the third embodiment, since padded difference signal is supplied to the DCT unit 111, efficiency in DCD process is increased, in addition to the effects provided by the third embodiment.

Embodiment 4

Figure 14:
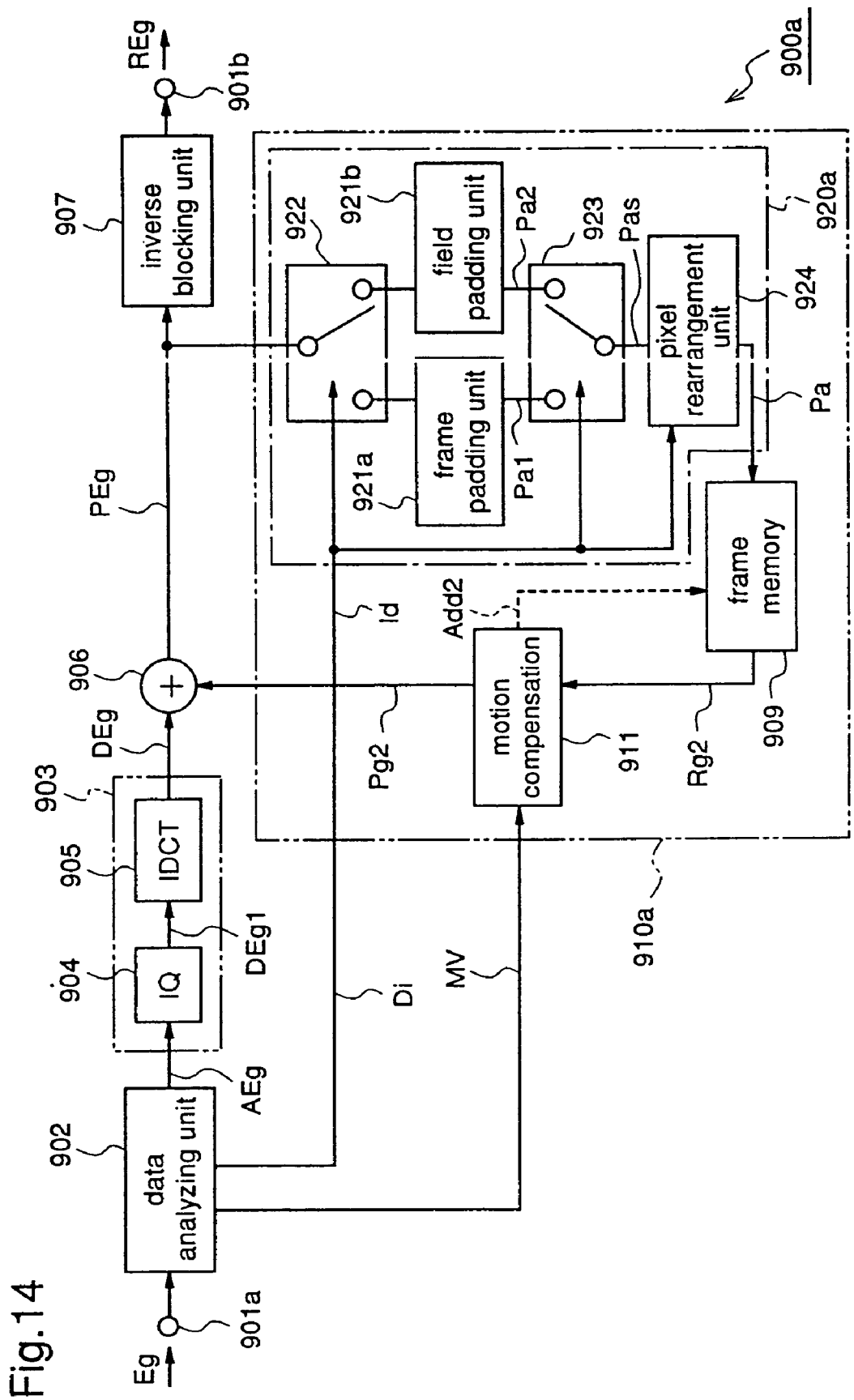
FIG. 14 is a block diagram showing an image decoding apparatus according to a fourth embodiment of the present invention.

FIG. 14 is a block diagram showing an image decoding apparatus according to a fourth embodiment of the present invention.

An image decoding apparatus 900a of the fourth embodiment is used to receive a bit stream 200 of the data structure in FIG. 11 as a coded image signal Eg in which an image signal has been compressively coded and perform decoding to the coded image signal Eg.

Specifically, the image decoding apparatus 900a includes a data analyzing unit 902 for receiving a coded difference signal Eg of a target block to be decoded (target block), and performing analysis and variable length decoding to the coded difference signal Eg, a data expanding device 903 for expanding an output AEg of the data analyzing unit 902 and outputting an expanded image signal DEg, an adder 906 for adding te output DEg to a prediction image signal Pg2 of the target block, an inverse blocking unit 907 for integrating reproduced image signals of respective blocks as an output of PEg of the adder 906 and outputting an image output signal REg of a scanning line structure, and a predicting section 910a for producing the prediction image signal Pg2.

The data expanding device 903 comprises an inverse quantizer 904 for inversely quantizing the output AEg of the data analyzing unit 902, and an IDCT unit 905 for performing IDCT (inverse discrete cosine transform) as one type of inverse frequency transform, to the output DEg1 of the inverse quantizer 904, and outputting the expanded difference image signal DEg.

The predicting section 910a includes a padding device 920a for performing padding to the output PEg of the adder 906, a frame memory 909 which contains an output Pa of the padding device 920a as a reproduced image signal, and a motion compensating unit 911 for generating an address Add2 of the frame memory 909 according to an output Rg2 of the frame memory 909 and a motion vector MV of the block which has been decoded by the data analyzing unit 902, and reading a prediction image signal Pg2 of the target block from the frame memory 909 which contains recorded data Rg2 using the address Add2.

The padding device 920a includes a frame padding unit 921a for performing padding to the output PEg of the adder 906 frame by frame, a field padding unit 921b for performing padding to the output PEg field by field, a primary switch 922 provided at a previous stage of these padding units, for supplying one of them with the output PEg according to the sample identifier Di from the data analyzing unit 902, a secondary switch 923 provided at a next stage thereof, for selecting one of outputs Pa1 and Pa2 of respective padding units according to the sample identifier, and a pixel rearrangement unit 924 for rearranging pixels of the padded image signal as a selected signal Pas from the secondary switch 923.

Besides, reference numerals 901a and 901b designate input and output terminals of the image decoding apparatus 900a, respectively.

Subsequently, operation will be described.

When the compressively coded image signal Eg, for example, the bit stream 200 in FIG. 11 is input to the input terminal 901a, the data analyzing unit 902 performs variable length decoding to the coded image signal by analysis. The resulting decoded data is output to the data expanding device 903 as a compressed difference signal AEg in which a quantization step or a DCT coefficient has been compressed. The data analyzing unit 902 also outputs the motion vector MV and the sample identifier Di to the predicting section 910a.

The data expanding device 903 expands the compressed difference signal to be restored to an expanded difference signal of the target block. Specifically, the inverse quantizer 904 inversely quantizes the compressed difference signal, and then the IDCT unit 905 performs inverse frequency transform to the output DEg1 of the quantizer 904, by transforming a signal in a frequency domain into a signal in a spatial domain.

The motion compensating unit 911 generates the address Add2 for accessing the frame memory 909 according to motion vector MV from the data analyzing unit 902 and extracts the prediction image signal Pg2 of the target block from the reproduced image signal stored in the frame memory 909. The adder 906 adds the output DEg of the data expanding device to the prediction image signal Pg2 and outputs the reproduced image signal PEg of the target block.

The reproduced image signal is supplied to the inverse blocking unit 907 and the predicting section 910a.

The inverse blocking unit 907 integrates the reproduced image signals to convert them into the reproduced image signal of the scanning line structure.

In the predicting section 910a, the reproduced image signal PEg is supplied to one of the frame padding unit 921a and the field padding unit 921b through the primary switch 922. Switching of the primary switch 922 is controlled in accordance with the sample identifier Di from the data analyzing unit 902. Where the value of the sample identifier Di is 1, that is, there is high correlation between pixels in the fields, the reproduced image signal PEg is supplied to the field padding unit 921b through the switch 922, and is subjected to intra-field padding therein.

Specifically, as shown in FIG. 10(c), padding is performed to the reproduced image signal PEg of small blocks 251 and 252 composed of first field lines in the image space 250c at a time, and the signal PEg of small blocks 253 and 254 composed of second field lines in the image space 250c corresponding to the reproduced image signal PEg at a time.

On the other hand, where the value of the sample identifier is 0, that is, there is high correlation between pixel values in the frame, the reproduced image signal PEg is supplied to the frame padding unit 921a through the switch 922 and is subjected to intra-frame padding therein. Specifically, as shown in FIG. 10(b), padding is performed to the reproduced image signal PEg of the small blocks 255-258 in the image space 250b corresponding to the reproduced image signal PEg at a time.

Thus padded reproduced image signal Pas is sent to the pixel rearrangement unit 924 through the secondary switch 923. The pixel rearrangement unit 924 rearranges pixels of the first field and pixels of the second field so that they have pixel rearrangement of the interlaced image, for the block which has been padded field by field. For example, the pixel rearrangement unit 924 converts the reproduced image signal Pas into a reproduced image signal of the image space 250e where lines of the upper region 250d1 in the image space 250d and lines of the lower region 250d2 in the small image space 250d (see FIG. 10(d)) are alternately arranged. On the other hand, for the block which has been padded frame by frame, the pixel rearrangement unit 924 does not rearrange pixels. Thus rearranged reproduced image signal Pa is stored in the frame memory 909.

In this fourth embodiment, described is a case where the reproduced image signal PEg corresponding to the interlaced image forms the image space. 250d in FIG. 10(d) the upper and lower regions 250d1 and 250d2 of which are composed of odd-numbered lines and even-numbered lines, respectively. On the other hand, for the case where the reproduced image signal PEg is output with the fields 1 and 2 merged, that is, the reproduced image signal PEg corresponding to the interlaced image forms the image space 250 in FIG. 10(a) where odd-numbered and even-numbered lines are alternately arranged, it becomes necessary to change an implementing method of the field padding unit 921b. In this case, prior to padding, pixels of the reproduced image signal PEg must be rearranged, to be converted into the image space 250d whose upper and lower regions are fields 1 and 2, respectively as shown in FIG. 10(d).

Also, in the case where the reproduced image signal PEg is output with the fields 1 and 2 merged as described above, sample values of pixels to-be-padded (insignificant pixels) may be replaced by sample values of significant pixels one sample spaced apart from the insignificant pixels without pixel rearrangement, for the image signal corresponding to a frame, rather than the field padding unit 921b has rearranged pixels so that odd-numbered lines and even-numbered lines of the frame are collected into the upper and lower regions, respectively, followed by padding field by field.

Besides, while in the fourth embodiment, pixels of the output of the field padding unit are rearranged, the pixel rearrangement unit 924 may be dispensed with when the output of the field padding unit is directly stored in the frame memory, because there is no necessity of rearranging pixels.

In addition, while in the fourth embodiment, the coded image signal which has been compressed by DCT is input, the input coded image signal may be a coded image signal which has been coded by wavelet, fractal, and the like. Also in this case, as in the case of the fourth embodiment, switching between the field padding and frame padding can be performed according to the degree of the correlation between pixels in the field.

Yet in addition, while the bit stream 200 comprises a sample identifier for each block, all the blocks can share the same sample identifier. In this case, the image signal must be first divided into fields 1 and 2, and then be subjected to blocking and coding, in view of efficiency in waveform transform.

Further, where all the blocks share the sample identifier described above, it may be provided in an image and at the head of a coded image signal. In this case, off course, the same identifier can be allocated to all the blocks.

Modification 1 of Fourth Embodiment

Figure 15:
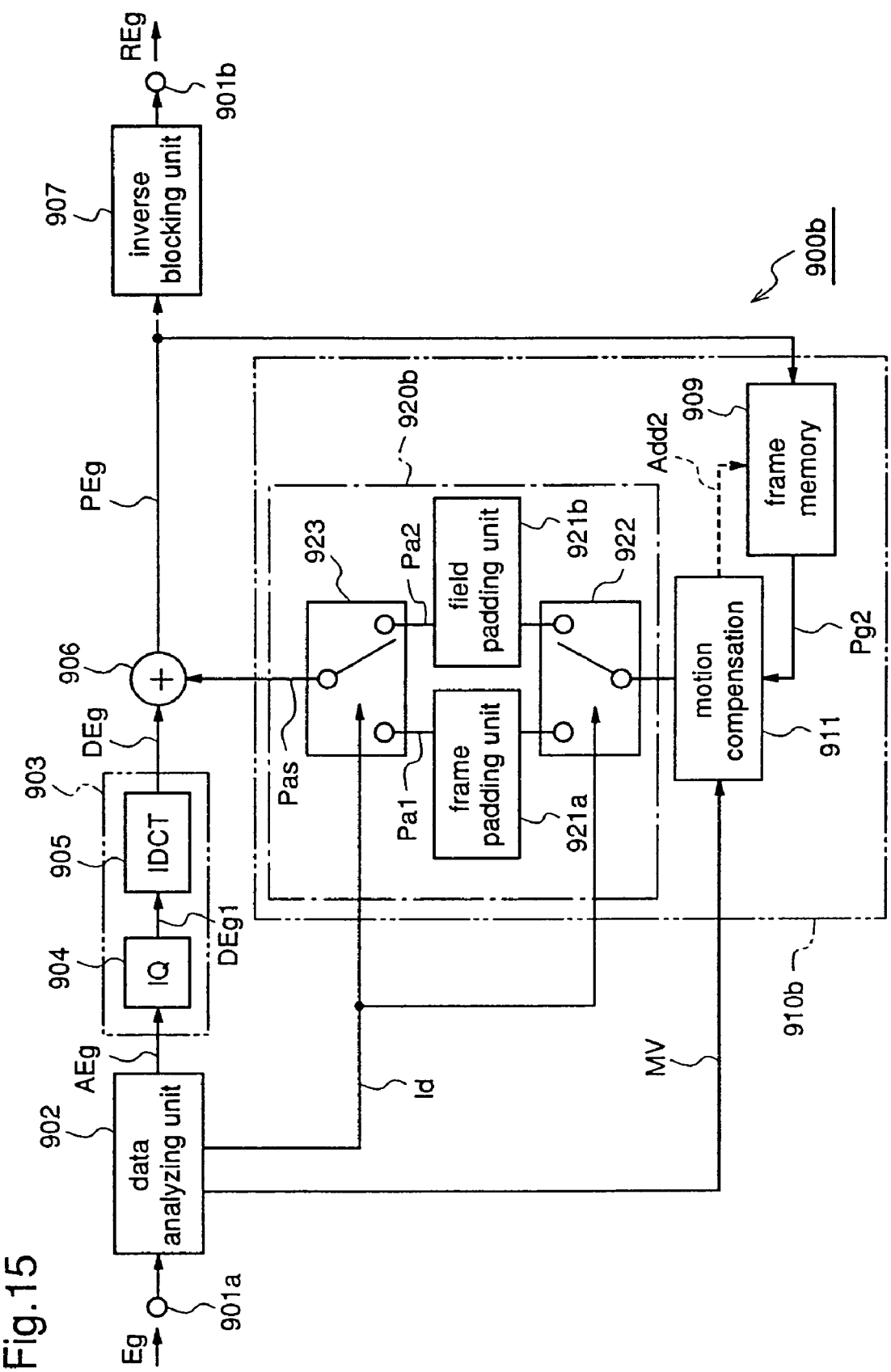
FIG. 15 is a block diagram for explaining an image decoding apparatus according to a modification 1 of the fourth embodiment.

FIG. 15 is a block diagram showing an image decoding apparatus according to a modification 1 of the fourth embodiment.

Construction and operation of an image decoding apparatus 900b of this embodiment are basically similar to those of the image decoding apparatus 900a of the fourth embodiment in FIG. 14.

In the image decoding apparatus 900b, the predicting section 910a of the image decoding apparatus 900a of the fourth embodiment is replaced by a predicting section 910b which differs in construction from the same.

In the predicting section 910b, there is provided a padding device 920b between a motion compensating unit 911 and an adder 906, for performing padding to a motion compensated prediction image signal Pg2 and supplying the resulting signal to the adder 906. The padding device 920b includes a frame padding unit 921a, a field padding unit 921b, a primary switch 922 for supplying one of these padding units with the prediction image signal Pg2 from the motion compensating unit 911 according to the sample identifier Di, and a secondary switch 923 for selecting one of outputs of the padding units according to the sample identifier Di and outputting a selected signal to the adder 906.

Subsequently, operation and effects will be described.

Motion compensation is performed to the interlaced image frame by frame or field by field. The frame by frame motion compensation is performed by obtaining a prediction image signal from a frame, while the field by field motion compensation is performed by obtaining prediction image signals from the corresponding first and second fields separately.

The image decoding apparatus 900b according to the modification 1 of the fourth embodiment provides effectiveness in the field by field motion compensation. In the image decoding apparatus 900b, switching of the primary switch 922 is controlled according to the sample identifier Di from the data analyzing unit 902, and the output of the motion compensating unit 911 is input to one of the frame padding unit 921a and the field padding unit 921b. The prediction image signal is padded by one of these padding units and supplied to the adder 906.

In this modification 1 of the fourth embodiment, since padding is performed to the prediction image signal fetched from the frame memory 909, amount of signals to-be-padded in the predicting section can be reduced, as compared to a case where padding is performed to all the reproduced image signals stored in the frame memory 909.

Modification 2 of Fourth Embodiment

Figure 16:
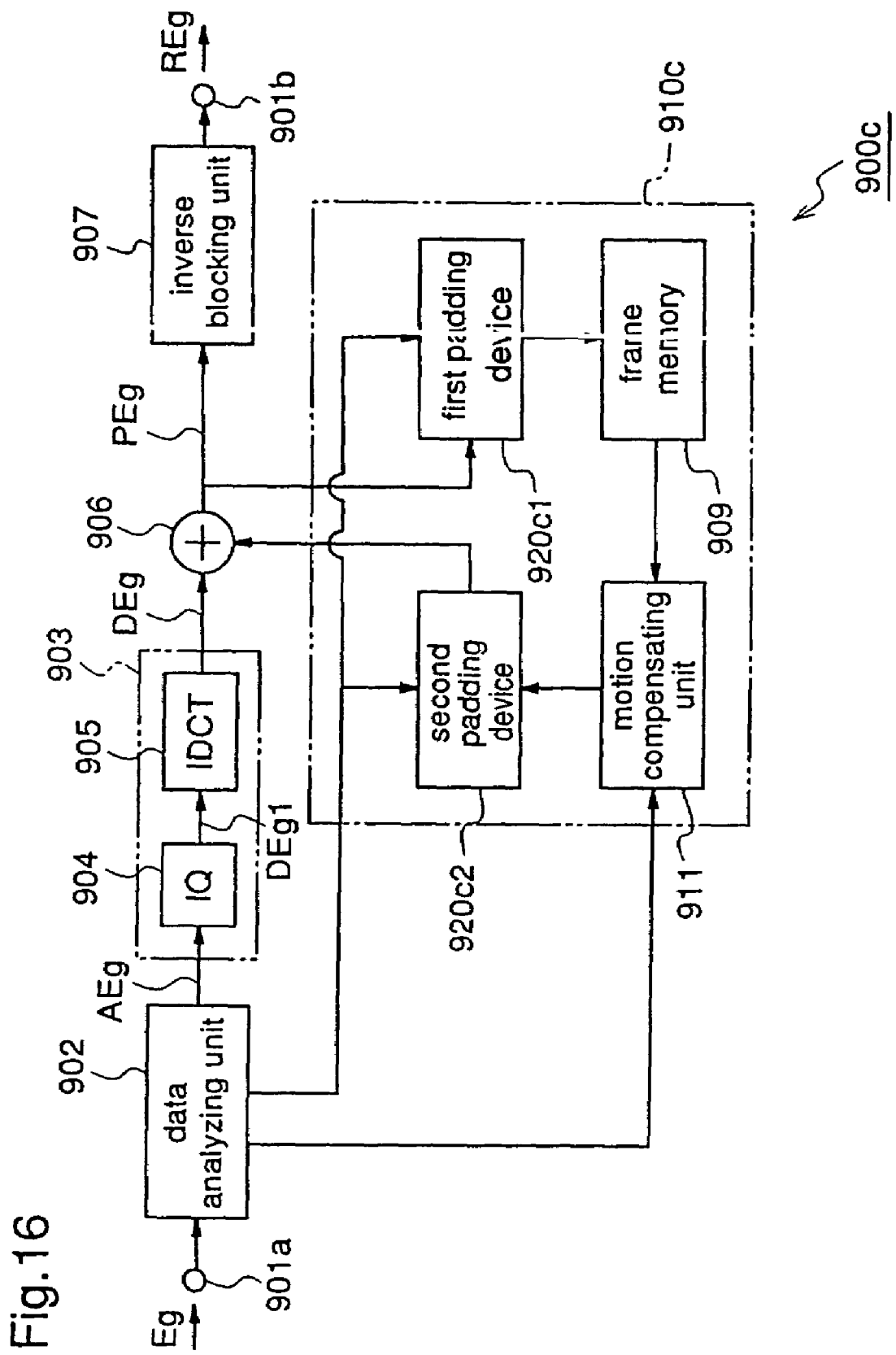
FIG. 16 is a block diagram showing an image decoding apparatus according to a modification 2 of the fourth embodiment.

FIG. 16 is a block diagram showing an image decoding apparatus according to modification 2 of the fourth embodiment. An image decoding apparatus 900c according to the modification 2 of the fourth embodiment has constructions of the image decoding apparatus 900a of the fourth embodiment and the image decoding apparatus 900b of its modification 1 in combination. In other words, in addition to the predicting section 910a comprising the padding device 920a of the image decoding apparatus 900a of the fourth embodiment, the image decoding apparatus 900c includes an auxiliary padding device (second padding device) 920c2 provided at a next stage of the motion compensating unit 911, the output of which is output to the adder 906. Here it is assumed that constructions of the first and second padding devices 920c1 and 920c2 are identical to those of the padding device 920a of the fourth embodiment and the padding device 920b of the modification 1 of the fourth embodiment, respectively.

In the modification 2 of the fourth embodiment thus constructed, the first and second padding devices 920c1 and 920c can share padding, whereby padding can be preformed in the predicting section with higher efficiency.

Furthermore, a program for implementing the digital image padding method or the image processing apparatus shown in each of the embodiments is recorded in a data recording medium such as a floppy disc, whereby processing is performed with ease in an independent computer system.

Figure 17:
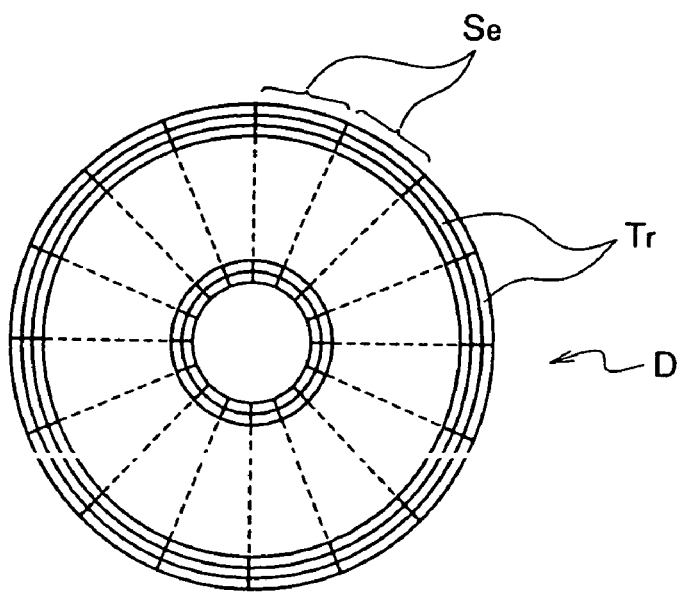
FIGS. 17(a), 17(b), and 17(c) are diagrams for explaining a data recording medium which contains a program for implementing image processing by the digital image padding method or in the image processing apparatus, in a computer system.
Figure 17:
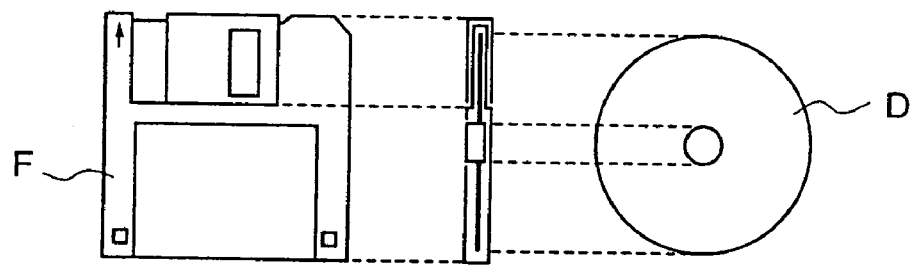
Figure 17:
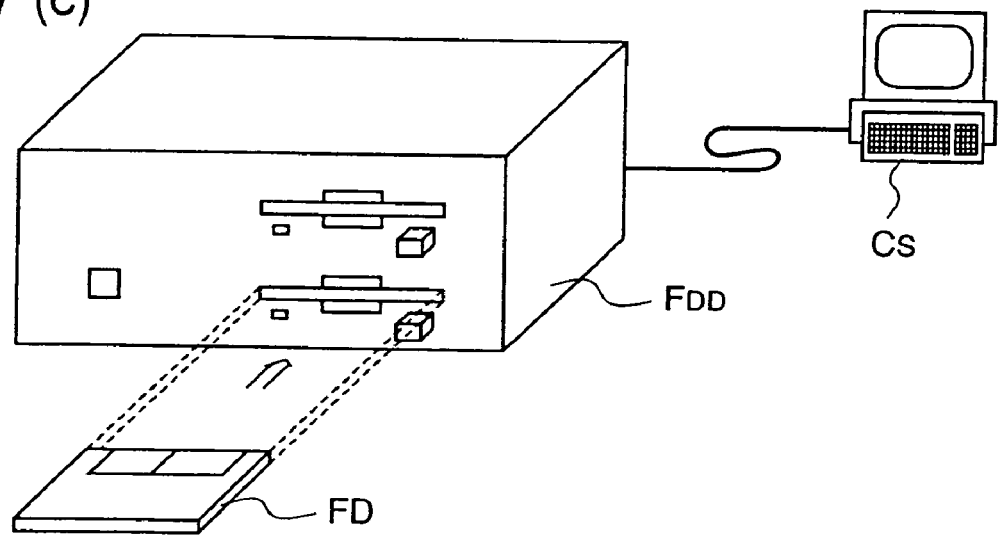

FIG. 17 is a diagram showing a case where image processing of the digital padding method, or image coding or image decoding of the image processing apparatus in the above embodiments is performed in a computer system by the use of a floppy disc which contains a program of these image processing.

FIG. 17(b) shows a front appearance and a cross-section of a floppy disc FD, and a floppy disc body as a recording medium. FIG. 17(a) shows a physical format of the floppy disc body D. The floppy disc body D is stored in a case F, and in a surface of the disc body D, plural tracks Trs are formed from outer to inner radius thereof, each track being divided into 16 sectors Se in angle direction. Therefore, in the floppy disc body D which contains the program, data of the program is recorded in an allocated region of the floppy disc FD.

FIG. 17(c) shows a construction of recording and reproducing the program in/from the floppy disc FD. In case of recording the program in the floppy disc FD, the data of the program is written thereto through the floppy disc drive FDD from the computer system Cs. In another case of constructing the image decoding method in the computer system Cs by the program in the floppy disc FD, the program is read from the floppy disc FD by the use of the floppy disc drive FDD and transferred to the computer system Cs.

While description has been given of image processing in a computer system by the use of the floppy disc as the data recording medium, this image processing can be also performed by the use of an optical disc. Besides, the recording medium is not limited to this, and an IC card, a ROM cassette, and so forth, may be used so long as they can record a program therein.

INDUSTRIAL APPLICABILITY

As described above, the digital image padding method, the image processing apparatus, and the data recording medium of the present invention, can increase coding efficiency in compression of an image signal, they are very useful in implementing coding or image decoding in a system which transmits/stores the image signal, and simultaneously they are suitable for compression and expansion of a moving picture according to a standard such as MPEG4.

The invention claimed is:

1. An image coding method for sequentially coding an input image comprising a plurality of pixels and including an image having an arbitrary shape, said image coding method comprising:
    identifying whether an input image is an interlace image or a progressive image, and generating identification information indicating a result of said identifying;
    performing motion compensation predictive coding for the input image by using a coded input image as a reference image; and
    padding pixel values of insignificant pixels in the coded input image, to be used as a reference image in the motion compensation predictive coding, on the basis of the identification information;
    wherein in said padding:
    when the input image is an interlace image, pixel values of insignificant pixels in the input image are padded in field units to generate a reference image to be used in the motion compensation predictive coding; and
    when the input image is a progressive image, the pixel values of insignificant pixels in the input image are padded in frame units to generate a reference image to be used in the motion compensation predictive coding.

2. An image coding method as claimed in claim 1, wherein in said performing motion compensation predictive coding, when the input image is an interlace image, the motion compensation predictive coding for the input image is performed in block units, each having a predetermined size, using the reference image in which the pixel values of insignificant pixels are padded in field units.

3. An image decoding method for sequentially decoding a coded input image comprising a plurality of pixels and including an image having an arbitrary shape, said image decoding method comprising:
    performing motion compensation predictive decoding for the coded input image by using a decoded input image as a reference image; and
    padding pixel values of insignificant pixels in the decoded input image, to be used as a reference image in the motion compensation predictive decoding, on the basis of identification information which is generated during coding of the input image and which indicates whether the coded input image is an interlace image or a progressive image;
    wherein in said padding:
    when the coded input image is an interlace image, pixel values of insignificant pixels in the decoded input image are padded in field units to generate a reference image to be used in the motion compensation predictive decoding; and
    when the coded input image is a progressive image, the pixel values of insignificant pixels in the decoded input image are padded in frame units to generate a reference image to be used in the motion compensation predictive decoding.

4. An image decoding method according to claim 3, wherein in said performing motion compensation predictive decoding, when the coded input image is an interlace image, the motion compensation predictive decoding for the coded input image is performed in block units, each having a predetermined size, using the reference image in which the pixel values of insignificant pixels are padded in field units.

5. A computer readable data recording medium containing a program operable to cause a computer to sequentially code an input image comprising a plurality of pixels and including an image having an arbitrary shape, said computer readable data recording medium comprising:
    a computer readable program code operable to cause the computer to identify whether an input image is an interlace image or a progressive image, and generate identification information indicating a result of the identification;
    a computer readable program code operable to cause the computer to perform motion compensation predictive coding for the input image by using an coded input image as a reference image; and
    a computer readable program code operable to cause the computer to pad pixel values of insignificant pixels in the coded input image, to be used as a reference image in the motion compensation predictive coding, on the basis of the identification information;
    wherein in the padding:
    when the input image is an interlace image, pixel values of insignificant pixels in the input image are padded in field units to generate a reference image to be used in the motion compensation predictive coding; and
    when the input image is a progressive image, the pixel values of insignificant pixels in the input image are padded in frame units to generate a reference image to be used in the motion compensation predictive coding.

6. A computer readable data recording medium as claimed in claim 5, wherein in the motion compensation predictive coding, when the input image is an interlace image, the motion compensation predictive coding for the input image is performed in block units, each having a predetermined size, using the reference image in which the pixel values of insignificant pixels are padded in field units.

7. A computer readable data recording medium containing a program operable to cause a computer to sequentially decode a coded input image comprising a plurality of pixels and including an image having an arbitrary shape, said computer readable data recording medium comprising:
    a computer readable program code operable to cause the computer to perform motion compensation predictive decoding for the coded input image by using a decoded input image as a reference image; and
    a computer readable program code operable to cause the computer to pad pixel values of insignificant pixels in the decoded input image, to be used as a reference image in the motion compensation predictive decoding, on the basis of identification information which is generated during coding of the input image and which indicates whether the coded input image is an interlace image or a progressive image;
    wherein in the padding:
    when the coded input image is an interlace image, pixel values of insignificant pixels in the decoded input image are padded in field units to generate a reference image to be used in the motion compensation predictive decoding; and
    when the coded input image is a progressive image, the pixel values of insignificant pixels in the decoded input image are padded in frame units to generate a reference image to be used in the motion compensation predictive decoding.

8. A computer readable data recording medium as claimed in claim 7, wherein in the motion compensation predictive decoding, when the coded input image is an interlace image, the motion compensation predictive decoding for the coded input image is performed in block units, each having a predetermined size, using the reference image in which the pixel values of insignificant pixels are padded in field units.

* * * * *